US012512461B2

(12) United States Patent
Divya et al.

(10) Patent No.: US 12,512,461 B2
(45) Date of Patent: Dec. 30, 2025

(54) CATHODE

(71) Applicant: VICTORIA LINK LIMITED, Wellington (NZ)

(72) Inventors: Shalini Divya, Wellington (NZ); Thomas Nann, New South Wales (AU)

(73) Assignee: VICTORIA LINK LIMITED, Wellington (NZ)

( * ) Notice: Subject to any disclaimer, the term of this patent is extended or adjusted under 35 U.S.C. 154(b) by 702 days.

(21) Appl. No.: 17/786,733

(22) PCT Filed: Dec. 18, 2020

(86) PCT No.: PCT/NZ2020/050177
§ 371 (c)(1),
(2) Date: Jun. 17, 2022

(87) PCT Pub. No.: WO2021/125980
PCT Pub. Date: Jun. 24, 2021

(65) Prior Publication Data
US 2023/0051173 A1  Feb. 16, 2023

(30) Foreign Application Priority Data
Dec. 20, 2019 (AU) .................................. 2019904855

(51) Int. Cl.
*H01M 4/36* (2006.01)
*H01M 4/46* (2006.01)
(Continued)

(52) U.S. Cl.
CPC ........... *H01M 4/364* (2013.01); *H01M 4/463* (2013.01); *H01M 4/485* (2013.01); *H01M 4/505* (2013.01);
(Continued)

(58) Field of Classification Search
None
See application file for complete search history.

(56) References Cited

U.S. PATENT DOCUMENTS 3,278,815 A    10/1966  Booe et al.
3,852,107 A    12/1974  Lorkin et al.
(Continued)

FOREIGN PATENT DOCUMENTS

CN    109309191 A    2/2019
CN    108470908 B    2/2021
(Continued)

OTHER PUBLICATIONS

Zhang, Kaiqiang et al., "Two-dimensional boron nitride as a sulfur fixer for high performance rechargeable aluminum-sulfur batteries," Scientific Reports, vol. 9, 2019, pp. 1-10.
(Continued)

*Primary Examiner* — Wyatt P McConnell
(74) *Attorney, Agent, or Firm* — POLSINELLI PC

(57) ABSTRACT

Disclosed are a cathode materials suitable for an aluminium ion battery, wherein the cathode materials comprise a main group element nitride, and an oxide of a main group element or an oxide of a element in Group 1 to 13. The nitride is preferably a 2-dimensional layered material. Preferably, the ratio of the main group element nitride to the oxide is between 5:95 and 95:5 (by weight).

13 Claims, 15 Drawing Sheets

(51) Int. Cl.
*H01M 4/485* (2010.01)
*H01M 4/505* (2010.01)
*H01M 4/58* (2010.01)
*H01M 4/62* (2006.01)
*H01M 10/054* (2010.01)
*H01M 50/46* (2021.01)
*H01M 4/02* (2006.01)

(52) U.S. Cl.
CPC ............. *H01M 4/58* (2013.01); *H01M 4/625* (2013.01); *H01M 10/054* (2013.01); *H01M 50/46* (2021.01); *H01M 2004/027* (2013.01); *H01M 2004/028* (2013.01)

(56) References Cited

U.S. PATENT DOCUMENTS

| | | | |
|---|---|---|---|
| 4,463,072 | A | 7/1984 | Gifford et al. |
| 5,139,901 | A | 8/1992 | Kawaguchi et al. |
| 5,554,458 | A | 9/1996 | Noda et al. |
| 7,842,419 | B2 | 11/2010 | Okada et al. |
| 9,105,907 | B2 | 8/2015 | Mofakhami et al. |
| 9,391,316 | B2 | 7/2016 | Kim et al. |
| 9,843,070 | B2 | 12/2017 | Dai et al. |
| 9,899,672 | B2 | 2/2018 | Zhamu et al. |
| 10,559,855 | B2 | 2/2020 | Mukherjee et al. |
| 10,693,137 | B2 | 6/2020 | Nemeth | |
| 2005/0109615 | A1 | 5/2005 | Dionne et al. |
| 2012/0082904 | A1 | 4/2012 | Brown et al. |
| 2013/0071753 | A1 | 3/2013 | Kim et al. |
| 2015/0236342 | A1 | 8/2015 | Rojeski |
| 2015/0249261 | A1 | 9/2015 | Dai et al. |
| 2017/0214095 | A1* | 7/2017 | Mukherjee ............ H01M 4/485 |
| 2018/0108909 | A1 | 4/2018 | Su et al. |
| 2018/0138554 | A1* | 5/2018 | Mukherjee .......... H01M 10/054 |
| 2018/0323467 | A1* | 11/2018 | Tang ................... H01M 4/1397 |
| 2019/0009330 | A1 | 1/2019 | King et al. |

FOREIGN PATENT DOCUMENTS

| | | |
|---|---|---|
| EP | 2538473 A1 | 12/2012 |
| EP | 2871692 A1 | 5/2015 |
| JP | S63264878 A | 11/1988 |
| JP | H07142055 A | 6/1995 |
| JP | H09120816 A | 5/1997 |
| WO | 2007055172 A1 | 5/2007 |
| WO | 2015006161 A1 | 1/2015 |
| WO | 2018147404 A1 | 8/2018 |

OTHER PUBLICATIONS

International Search Report and Written Opinion issued on Mar. 31, 2021 for corresponding PCT Application No. PCT/NZ2020/050177.

* cited by examiner

CATHODE

CROSS-REFERENCE TO RELATED APPLICATIONS

This application is a national stage application (under 35 U.S.C. § 371) of PCT/NZ2020/050177, filed Dec. 18, 2020, which claims benefit of Australian Application No. 2019904855, filed Dec. 20, 2019, which are incorporated herein by reference in their entireties.

FIELD OF INVENTION

The invention relates to an improved cathode for aluminium ion batteries, an aluminium ion battery including an improved cathode, and a method of manufacturing a cathode for an aluminium ion battery.

BACKGROUND TO THE INVENTION

Batteries are an important source of stored electrical energy and are widely used in many different types of devices and applications.

Performance of batteries is highly dependent on many factors including the physicochemical properties of the materials from which the electrode(s) of the battery are made; and the electrolyte solutions. Such factors affect battery performance by decreasing the battery voltage, coulombic efficiency, lowering the rate capability (maximum charge/discharge rate) of the cell and cell stability.

There are many different types of batteries in use including lead-acid, nickel and cadmium based, and ion batteries. Common to all of these battery types is the presence of a cathode, an anode, and an electrolyte solution, which can be connected to form an electrical circuit and used to provide a source of energy to devices.

In recent years, there has been a surge in interest in ion batteries for use in commercial applications due to the benefits that such batteries can provide. Currently, lithium-ion batteries (LIBs) have a high charge density, low tendency to self-discharge, low memory effects, low recharge times and low maintenance compared with other rechargeable batteries like NiCd nickel cadmium (NiCd), nickel metal hydride (NiMH), etc.

LIBs have found widespread application in devices such as electric vehicles, mobile phones, and other electronic devices. However, they are still not widely used for grid energy storage. The LIB industry uses 42% of global cobalt production, an essential metal for lithium-ion cells. Lithium metal is reactive and shipping of its raw materials requires extra attention to prevent any physical or electrical harm. Despite substantial cost reductions in recent years, LIBs are still significantly more expensive than other batteries. Furthermore, LIBs may be subject to thermal runaway. If this happens, the electrolyte heats up during discharge, leading to unwanted exothermic reactions. The extra heat produced in a battery cell then leads to electrolyte leakage, gas leakage and/or explosions. LIBs may also form metallic lithium dendrites that can pierce a battery separator and cause damage and thermal runaway. LIBs also often utilise electrolytes that are highly flammable, and this enhances a LIB's combustible nature.

Lead-acid batteries are another commonly used type of battery and utilise lead dioxide as a cathode material. Lead-acid batteries are commonly used electrical energy storage systems such as in motor vehicles; industrial motive power, trucks, mining vehicles; stationary use, emergency, and standby power. However, lead acid batteries are at risk of fire, explosion, and electrical shocks. They can be slow to charge, and self-discharge if not used for periods of time. Despite their common use, there are a number of problems with lead acid batteries such as: evolution of hydrogen and oxygen gas; leakage of sulfuric acid; sulfation of the battery reduces the electrical efficiency and cell longevity; freezing of the battery at low discharge levels; loss of active materials from electrodes; damage to the electrodes. Furthermore, lead is a heavy metal and toxic to humans and the environment.

Nickel based batteries, such as NiCd and NiMH batteries, use nickel oxyhydroxide (NiOOH) as the cathode material. NiMH batteries are used in hybrid electric vehicles and in military communications. However, while NiMH batteries have good cycle life, long shelf life and operate at a wide variety of temperatures, the production costs of the metal-hydride alloys are high making this type of battery expensive. NiCd batteries provide good performance under rough conditions and are tolerant to deep discharge for long periods. However, the cost of materials is high. Further, cadmium is highly toxic to the environment, making its disposal problematic after the battery expires. This has led to its decreased use (or even ban) in some regions such as in Europe.

Conversely, rechargeable aluminium ion batteries (AIBs) offer a potential alternative to lithium ion batteries. Aluminium is a trivalent metal having three valence electrons in its outer shell. Aluminium's trivalency allows aluminium-ion batteries to have a higher (theoretical) energy density (more energy per unit volume—8100 Wh/kg) compared with elements having a lower number of valence electrons, such as lithium, sodium, potassium, and calcium, etc. Volumetric capacity of aluminium (between four and seven times larger than that of lithium and sodium respectively) offers the potential to drastically enhance battery energy density.

Further aluminium ion batteries are safer to handle than the other ion batteries noted above; their electrolytes are non-flammable, or much less flammable compared to the electrolytes of LIBs; they may have a reduced environmental impact as the main component of the battery—aluminium— can be easily recycled when compared with other ion batteries; they provide ease of handling in an ambient environment, which may provide safety benefits when compared to other metal ion batteries; they are cheaper to manufacture when compared to other ion batteries; and use more abundant base materials.

Cathode materials for rechargeable aluminium ion batteries have suffered from many intrinsic issues including low discharge potentials; unstable discharge voltage plateaus, which mean the battery will not recognise a cut-off voltage; poor electrochemical reversibility leading to low coulombic efficiencies; limited cycle life and structural disintegration of the cathodes, resulting in low and unstable discharge capacities which provide a sharp decay after few cycles.

As cathode materials are specific for each battery type, materials that perform well in one battery type, are unlikely to provide similar performance in aluminium ion batteries. For example, cathodes for lithium ion batteries may not provide equivalent performance in aluminium ion batteries. Further, materials used for anodes may not be used as cathodes due to the physical properties of the material that are required to function as an anode or cathode respectively.

Therefore, it is an object of the invention to provide a cathode for use in an aluminium ion battery that overcomes the deficiencies of the prior art, or at least provides the public with a useful choice.

Alternatively, it is an object to provide an aluminium ion battery including a cathode that overcomes some of the deficiencies of the prior art, or at least provides the public with a useful choice.

SUMMARY OF THE INVENTION

Cathode

In one aspect of the present invention, there is provided a cathode material for an aluminium ion battery, wherein the cathode material comprises a main group element nitride.

In another aspect of the present invention, there is provided a cathode material for an aluminium ion battery, wherein the cathode material comprises a nitride of a Group 13 element.

In another aspect of the present invention, there is provided a cathode material for an aluminium ion battery, wherein the cathode material comprises a nitride of boron.

In another aspect of the present invention, there is provided a cathode material for an aluminium ion battery, wherein the cathode material comprises a nitride of carbon.

In another aspect of the present invention, there is provided a cathode material for an aluminium ion battery, wherein the cathode material comprises a nitride of silicon.

In another aspect of the present invention, there is provided a cathode material for an aluminium ion battery, wherein the cathode material comprises a nitride of aluminium.

In another aspect of the present invention, there is provided a cathode material for an aluminium ion battery, wherein the cathode material comprises a nitride of lithium.

In another aspect of the present invention, there is provided a cathode material for an aluminium ion battery, wherein the cathode material comprises an oxide of boron.

In another aspect of the present invention, there is provided a cathode material for an aluminium ion battery comprising a main group element nitride, and a chalcogenide of a main group element.

In another aspect of the present invention, there is provided a cathode material for an aluminium ion battery comprising a main group element nitride, and a chalcogenide of an element in Group 1-13 of the periodic table.

In another aspect of the present invention, there is provided a cathode material for an aluminium ion battery, wherein the cathode material comprises a main group element nitride, and a chalcogenide of an element in Group 13.

In another aspect of the present invention, there is provided a cathode material for an aluminium ion battery, wherein the cathode material comprises a main group element nitride, and a chalcogenide of boron.

In another aspect of the present invention, there is provided a cathode material for an aluminium ion battery comprising a main group element nitride, and an oxide of a main group element.

In another aspect of the present invention, there is provided a cathode material for an aluminium ion battery comprising a main group element nitride, and an oxide of an element in Group 1-13.

In an example, the oxide of an element in Group 1-13 may be selected from oxides of transition metal elements. Specific examples of transition metal oxides may include oxides of titanium and manganese.

In an example, the main group element nitride may be selected from a nitride of boron, carbon, aluminium, and silicon.

In another aspect of the present invention, there is provided a cathode material for an aluminium ion battery, wherein the cathode material comprises a main group element nitride, and an oxide of an element in Group 13.

In another aspect of the present invention, there is provided a cathode material for an aluminium ion battery, wherein the cathode material comprises a main group element nitride, and an oxide of boron.

In another aspect of the present invention, there is provided a cathode material for an aluminium ion battery, wherein the cathode material comprises a nitride of a Group 13 element, and a chalcogenide of a main group element.

In another aspect of the present invention, there is provided a cathode material for an aluminium ion battery, wherein the cathode material comprises a nitride of a Group 13 element, and a chalcogenide of an element in Group 1-13 of the periodic table.

In another aspect of the present invention, there is provided a cathode material for an aluminium ion battery, wherein the cathode material comprises a nitride of a Group 13 element, and a chalcogenide of a Group 13 element.

In another aspect of the present invention, there is provided a cathode material for an aluminium ion battery, wherein the cathode material comprises a nitride of a Group 13 element, and a chalcogenide of boron.

In another aspect of the present invention, there is provided a cathode material for an aluminium ion battery, wherein the cathode material comprises a nitride of a Group 13 element, and an oxide of a main group element.

In another aspect of the present invention, there is provided a cathode material for an aluminium ion battery, wherein the cathode material comprises a nitride of a Group 13 element, and an oxide of an element in Group 1-13 of the periodic table.

In another aspect of the present invention, there is provided a cathode material for an aluminium ion battery, wherein the cathode material comprises a nitride of a Group 13 element, and an oxide of a Group 13 element.

In another aspect of the present invention, there is provided a cathode material for an aluminium ion battery, wherein the cathode material comprises a nitride of a Group 13 element, and an oxide of boron.

In another aspect of the present invention, there is provided a cathode material for an aluminium ion battery, wherein the cathode material comprises a nitride of boron, and a chalcogenide of a main group element.

In another aspect of the present invention, there is provided a cathode material for an aluminium ion battery, wherein the cathode material comprises a nitride of boron, and a chalcogenide of an element in Group 1-13 of the periodic table.

In another aspect of the present invention, there is provided a cathode material for an aluminium ion battery, wherein the cathode material comprises a nitride of boron, and a chalcogenide of a Group 13 element.

In another aspect of the present invention, there is provided a cathode material for an aluminium ion battery, wherein the cathode material comprises a nitride of boron, and a chalcogenide of boron.

In another aspect of the present invention, there is provided a cathode material for an aluminium ion battery, wherein the cathode material comprises a nitride of boron, and an oxide of a main group element.

In another aspect of the present invention, there is provided a cathode material for an aluminium ion battery, wherein the cathode material comprises a nitride of boron, and an oxide of an element in Group 1-13 of the periodic table.

In another aspect of the present invention, there is provided a cathode material for an aluminium ion battery, wherein the cathode material comprises a nitride of boron, and an oxide of a Group 13 element.

In another aspect of the present invention, there is provided a cathode material for an aluminium ion battery, wherein the cathode material comprises a nitride of boron, and an oxide of boron.

In an example, the main group element nitrides are selected from the group comprising: carbon nitride, lithium nitride, aluminium nitride, boron nitride, silicon nitride, gallium nitride, and indium nitride. Preferred main group element nitrides are selected from the group comprising carbon nitride, boron nitride, silicon nitride and aluminium nitride.

In an example, the chalcogenides of Group 1-13 elements may be selected from chalcogenides of alkali metals, chalcogenides of alkaline earth metals, chalcogenides of transition metal (Groups 3 to 12) and chalcogenides of Group 13 elements. Alkali metal chalcogenides may be selected from chalcogenides of lithium, sodium, potassium and rubidium. Alkaline earth metal chalcogenides may be selected from chalcogenides of beryllium, magnesium, calcium, strontium and barium. Transition metal chalcogenides may be selected from chalcogenides of scandium, titanium, vanadium, chromium, manganese, iron, cobalt, nickel, copper, zinc, yttrium, zirconium, niobium, molybdenum, technetium, ruthenium, rhodium, palladium, silver, cadmium, hafnium, tantalum, tungsten, rhenium, osmium, iridium, platinum, gold, and mercury. Preferably, transition metal chalcogenides are selected from chalcogenides of titanium, manganese, vanadium, iron, nickel, zinc, molybdenum and tantalum. Group 13 chalcogenides may be selected from oxides of boron, aluminium, gallium, indium, and thallium.

In an example, the chalcogenides of Group 1-13 elements may be selected from oxides of Group 1-13 elements, including oxides of transition metal elements. Specific examples of transition metal oxides include oxides of titanium and manganese.

In an example, the main group chalcogenides are selected from main group oxides. In an example, the main group chalcogenides are selected from chalcogenides of boron. In a particular example, the main group chalcogenides are selected from oxides of boron. In a more particular example, the oxide of boron is boric anhydride ($B_2O_3$).

In an example, the main group nitrides may comprise a morphology selected from 2D layered materials, crystalline materials, nano-particles, quantum dots, nano-wires, nano-sheets, nano-rods, micro-particles sheets, and flowers. Such morphologies will be familiar to those of skill in the art. In an example, the morphology is a 2D layered material. In an example, the main group nitrides are 2D layered materials of carbon nitride, silicon nitride, aluminium nitride and boron nitride. In a particular example, the main group nitride is hexagonal boron nitride.

Alternatively, where the nitride is boron nitride, the boron nitride may be of any polymorph including: diamond-like cubic (sphalerite structure), wurtzite boron nitride and hexagonal boron nitride.

In an example, where the cathode material comprises a main group element nitride and a chalcogenide of an element in Group 1-13, the weight ratio of the chalcogenide to the nitride in the cathode material may be between 5:95 and 95:5, between 10:90 and 90:10, between 20:80 and 80:20, between 30:70 and 70:30, between 40:60 and 60:40, or between 45:55 and 55:45. In a particular example, the ratio is about 50:50. In an example, the proportion of chalcogenide is at least 5% by weight of the active material in the cathode. In an example, the proportion of nitride is at least 5% by weight of the active material in the cathode.

In an example, where the cathode material comprises an oxide of an element in Group 1-13 and a main group element nitride, the weight ratio of the oxide to the nitride in the cathode material may be between 5:95 and 95:5, between 10:90 and 90:10, between 20:80 and 80:20, between 30:70 and 70:30, between 40:60 and 60:40, or between 45:55 and 55:45. In a particular example, the ratio is about 50:50. In an example, the proportion of oxide is at least 5% by weight of the active material in the cathode. In an example, the proportion of nitride is at least 5% by weight of the active material in the cathode.

In an example, where the cathode material comprises an oxide of boron and a boron nitride, the weight ratio of the oxide of boron to the boron nitride in the cathode material may be between 5:95 and 95:5, between 10:90 and 90:10, between 20:80 and 80:20, between 30:70 and 70:30, between 40:60 and 60:40, or between 45:55 and 55:45. In a particular example, the ratio is about 50:50. In an example, the proportion of the oxide of boron is at least 5% by weight of the active material in the cathode. In an example, the proportion of boron nitride is at least 5% by weight of the active material in the cathode.

In an example, the active material of the cathode consists essentially of a combination of a main group element nitride, and a chalcogenide of an element in Group 1-13.

In an example, the cathode material comprises a nanostructure or mesostructure to provide increased surface area, and improved contact with the electrolyte. For example, the nanostructures and mesostructures include nanopores and/or mesopores.

In an example, the main group nitrides may be of a particle size of between 0.5 nm-100 μm.

In an example, the oxide may be of a particle size of between 0.5 nm-100 μm.

In an example, the cathode material comprises a binder. The binder may be a non-conductive material such as a polymer. Those of skill in the art will readily understand that the binder is used to assist in the preparation of the cathode and assists the cathode in sticking to a current collector, when assembled in a battery. Suitable binders for use on cathodes will be understood by those of skill in the art. Preferably, the binder is selected from polyvinyl fluoride (PVDF), and polytetrafluoroethylene (PTFE).

In an example, the cathode for an aluminium ion battery may comprise a conductive material. The conductive material may be selected from: conductive carbon, acetylene black and mixtures thereof. Those of skill in the art will realise that the conductive carbon is intended to counteract the reduction in conductivity provided by the addition of the binder.

In an example, the cathode comprises at least 75% (by weight) active material, or more preferably at least 80% (by weight) active material, or more preferably about 85% (by weight) active material.

In an example, the active material of the cathode of the present invention consists essentially of the oxides and/or nitrides specified herein. For example, in an embodiment of the cathode of the present invention, the active material consists essentially of oxides of boron and nitrides of boron.

Battery

In another aspect of the present invention, there is provided an aluminium ion battery, wherein the aluminium ion battery includes a cathode as described herein, such as a cathode comprising a main group element nitride.

Anode

In an example, the aluminium ion battery further comprises an anode, such as an aluminium anode.

In an example, the anode may comprise at least one compound or material that is able to function as an anode in a battery. For instance, the anode may comprise a material suitable for use with an electrolyte and the cathode of the aluminium ion battery.

The aluminium anode may comprise at least one material that can undergo a process selected from: (i) intercalation; and (ii) reversible electrochemical deposition and dissolution, at the intended operating temperatures of the battery according to the present invention.

Materials suitable for use as anodes in aluminium ion batteries described herein, would be readily understood by one skilled in the art. However, for the avoidance of doubt, materials suitable for the anode include: aluminium foil, for example aluminium sheets, thin aluminium metal disc, aluminium alloys. In an example, the anode is an aluminium disc. In an example, the aluminium discs are about 0.1 mm thickness and about 99% aluminium purity. Alternatively, suitable anodes include aluminium alloys comprising aluminium and at least one selected from the group: chromium, cobalt, copper, iron, lithium, magnesium, manganese, nickel, silicon, tin, titanium, tungsten, vanadium, zinc and zirconium.

Electrolyte

In an example, the aluminium ion battery comprises an electrolyte, wherein the electrolyte provides an electrical connection between the cathode and the anode and facilitates movement of ions there between during charging and discharging of the battery.

In an example, the electrolyte comprises at least one ion suitable for use in an aluminium ion battery. Suitable electrolytes comprise ions selected from at least one of $Al^{3+}$, $Mg^{2+}$, $Li^+$, $Na^+$, $K^+$, or combinations thereof.

In an example, the electrolyte is an ionic liquid. The ionic liquid may have properties and/or characteristics that make it suited or adapted for use in an ionic battery. For instance, the ionic liquid may be selected for use with a specific anode/cathode pair. Beneficial properties of the electrolyte include preventing or reducing oxidation of the anode; and/or preventing or reducing production of by-products during charging and discharging of the battery in use. Such by-products comprise: chlorine gas; hydrogen gas when using aqueous electrolytes.

In other preferred embodiments, the ionic liquid may be any ionic liquid, which can act as a Lewis Acid. Those of skill in the art will readily understand that Lewis Acid properties are beneficial because a Lewis Acid: (i) prevents or reduces formation of an oxide layer ($Al_2O_3$) on the anode; (ii) prevents or reduces formation of dendrites that can pierce through a separator and cause short circuit; (ii) prevents or reduces release of chlorine gas, which may be released when using aqueous electrolytes such as NaCl, KCl.

Suitable ionic liquids include those that can be used safely in an aluminium ion battery and would be familiar to a person of skill in the art. Suitable ionic liquids may comprise: imidazolium ionic liquids, including: ethyl methyl imidazolium halides (such as chlorides, bromides, iodides, and mixtures thereof); ionic liquids comprising: acetamide, urea, NaCl—$AlCl_3$, aqueous solutions of aluminium salts and metal hydroxides, and mixtures thereof. In an example, the ionic liquid comprises: aluminium chloride and a 1-ethyl methylimidazolium halide. In another example, 1-ethyl methylimidazolium halide is selected from the group consisting of 1-ethyl methylimidazolium chloride, 1-ethyl methylimidazolium bromide, 1-ethyl methylimidazolium iodide, and mixtures thereof.

In a particular example, the ionic liquid may comprise a combination of aluminium chloride ($AlCl_3$) and 1-ethyl-3-methylimidazolium chloride ([EMIm]Cl). More particularly, the ionic liquid may be aluminium chloride ($AlCl_3$) and 1-ethyl-3-methylimidazolium chloride in a ratio of between about 1:1 to about 1.5:1, such as a ratio of about 1.3:1.

Other electrolytes are envisaged as being suitable for use with the present invention, including those comprising different ions and in different concentration ranges.

Separator

In a further embodiment, the aluminium ion battery comprises an ion-permeable separator for separation of the cathode and anode in an aluminium ion battery.

Suitable separators would be known to those of skill in the art and may be selected from the group comprising: polymers including: PTFE (polytetrafluoroethylene), cellulose acetate, nitrocellulose, polysulfone, polyether sulfone, polyacrylonitrile, poly-amide, poly-imide, polyethylene, polyvinylchloride (PVC); NAFION, nylon, ceramic, poly-ester, rubber; glass separators including: glass microfibers; glass mats; and mixtures and combinations thereof.

In one example, the separator is a mesh made from a non-conductive material. In one example, the separator is a glass microfibre. In another example, the separator is an ion-permeable membrane.

Current Collectors

In a further embodiment, the aluminium ion battery may comprise one or more current collectors. In an example, current collectors are located on both the anode and cathode sides of the battery. The battery may include a current collector for the cathode and/or anode. Current collectors may be a substrate to which the cathode is attached, and in use, facilitates the flow of electrons through an outside electrical circuit during discharging (and charging as the case may be) of the battery. Examples of suitable current collectors include any material or combination of materials that can conduct electricity. A current collector can be a mesh/sheet/foil made of any metal that does not react with the electrolyte. Preferably, the current collector is selected from: molybdenum, nickel, and tungsten.

Cell

In a further aspect of the invention, there is provided an aluminium ion battery cell comprising a cathode as described herein.

In an example, the cell further comprises an anode comprising aluminium.

In an example, the cell further comprises an electrolyte.

In an example, the cell further comprises an ion permeable separator.

In a further aspect of the invention, there is provided an aluminium ion battery cell comprising a cathode, wherein the cathode comprises an oxide of boron and a boron nitride, wherein the ratio of the oxide of boron to the boron nitride is between 5:95 and 95:5 (by weight).

Battery Module

In a further aspect of the invention, there is provided an aluminium ion battery module including two or more aluminium ion batteries, wherein at least one of the aluminium ion batteries comprises a cathode as described herein.

Electrical Devices

In a further aspect of the invention, there is provided an electrical device, wherein the electrical device includes an aluminium ion battery as substantially described herein.

Use

In a further aspect of the invention, there is provided a use of a cathode as described herein in an aluminium ion battery.

In a further aspect of the invention, there is provided a use of a main group element nitride in the manufacture of a cathode for an aluminium ion battery cell.

In a further aspect of the invention, there is provided a use of a chalcogenide of a main group element in the manufacture of a cathode for an aluminium ion battery cell.

In a further aspect of the invention, there is provided a use of a combination of a main group element nitride, and a chalcogenide of an element in Group 1-13 in the manufacture of a cathode for an aluminium ion battery cell.

In a further aspect of the invention, there is provided a use of a combination of an oxide of boron and a boron nitride in the manufacture of a cathode for an aluminium ion battery cell, wherein the ratio of the oxide of boron to the boron nitride is between 5:95 and 95:5 (by weight).

According to another embodiment of the invention, the aluminium ion battery may be used in electrical devices such as: e-bicycles; electric vehicles; computers; hand-held electrical devices, phones, tablets; storage devices for electrical grids.

Method of Manufacture

In a further aspect of the present invention, there is provided a method of manufacturing a battery, wherein the method includes the step of forming a cathode comprising a main group element nitride, or a chalcogenide of an element in Group 1-13, or a combination thereof, in the manufacture of a cathode for an aluminium ion battery cell.

In a further aspect of the present invention, there is provided a method of manufacturing a cathode for an aluminium ion battery, wherein the method includes the step of forming a cathode using a main group element nitride, or a chalcogenide of an element in Group 1-13, or a combination thereof.

In yet another embodiment of the invention, the method of manufacturing a cathode for an aluminium ion battery comprises the steps of:
  (i) preparing a slurry, wherein the slurry comprises mixing, in no particular order:
     a. a main group element nitride and/or a chalcogenide of an element in Group 1-13;
     b. a polar solvent;
     c. optionally a binder;
     d. optionally a conductive material;
  (ii) applying the slurry to a collector material;
  (iii) drying the slurry to provide a dried product.

The dried product preferably comprises at least 75% (by weight) active material, or more preferably at least 80% (by weight) active material, or more preferably about 85% (by weight) active material.

The polar solvent may be selected from: water, ethanol, methanol, dimethyl sulfoxide (DMSO), dimethyl formamide (DMF), and N-methyl-pyrrolidone (NMP). In a preferred embodiment, the solvent is N-methyl-2-pyrrolidone (NMP).

The foregoing discussion should not be seen as limiting on the scope of the present invention. Other electrolytes are envisaged as being suitable for use with the present invention, including those comprising different ions and in different concentration ranges.

It should also be understood that a battery according to the present invention may include other components necessary to ensure desired performance. Representative additional components that may be included in a battery are described herein in what should be understood are non-limiting terms.

Further embodiments of the invention, which should be considered in all its novel embodiments, will become apparent to those skilled in the art upon reading of the following description which provides at least one example of a practical application of the invention.

BRIEF DESCRIPTION OF THE DRAWINGS

One or more embodiments of the invention will be described below by way of example only, and without intending to be limiting, with reference to the following drawings, in which.

Figure 11:
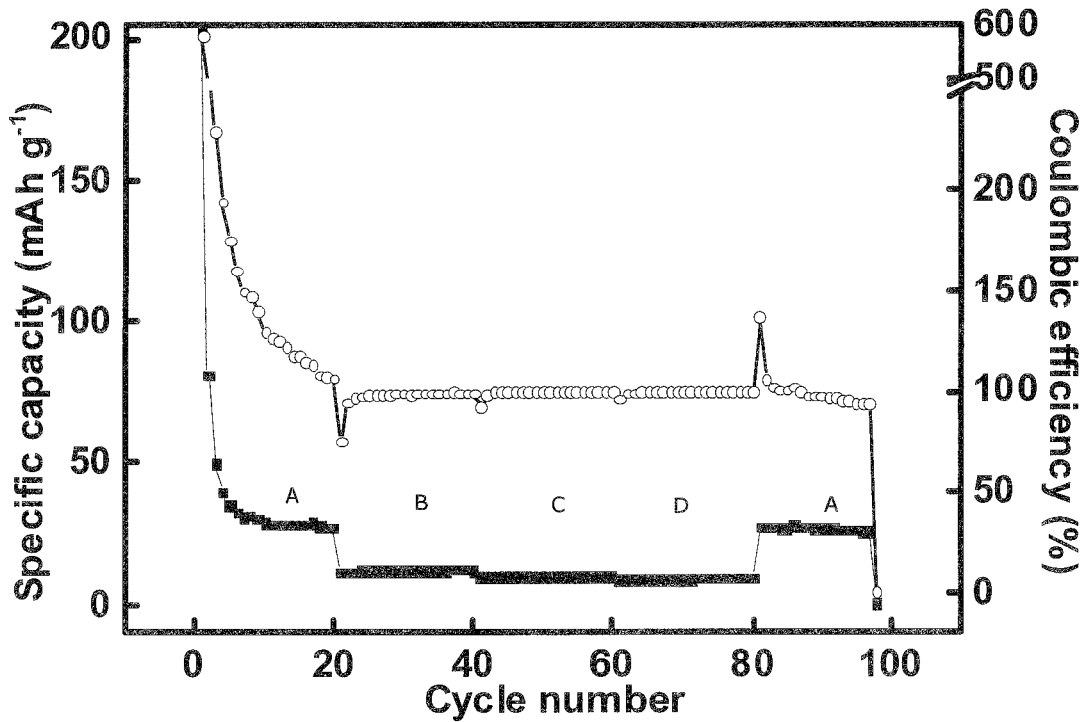

FIG. 11 shows a plot of the specific capacity and coulombic efficiency over repeated charge/discharge cycles, shifting at approximately 20 cycle intervals from 50 mA/g (A) to 500 mA/g (B) to 1 A/g (C) to 1.5 A/g (D) and then back to 50 mA/g (A), for an aluminium ion cell comprising a cathode with a 1:1 ratio (by weight) of $B_2O_3$ and $Si3N_4$ silicon nitride. Symbol ■ denotes the specific capacity and symbol ○ represents the coulombic efficiency.

Figure 12:
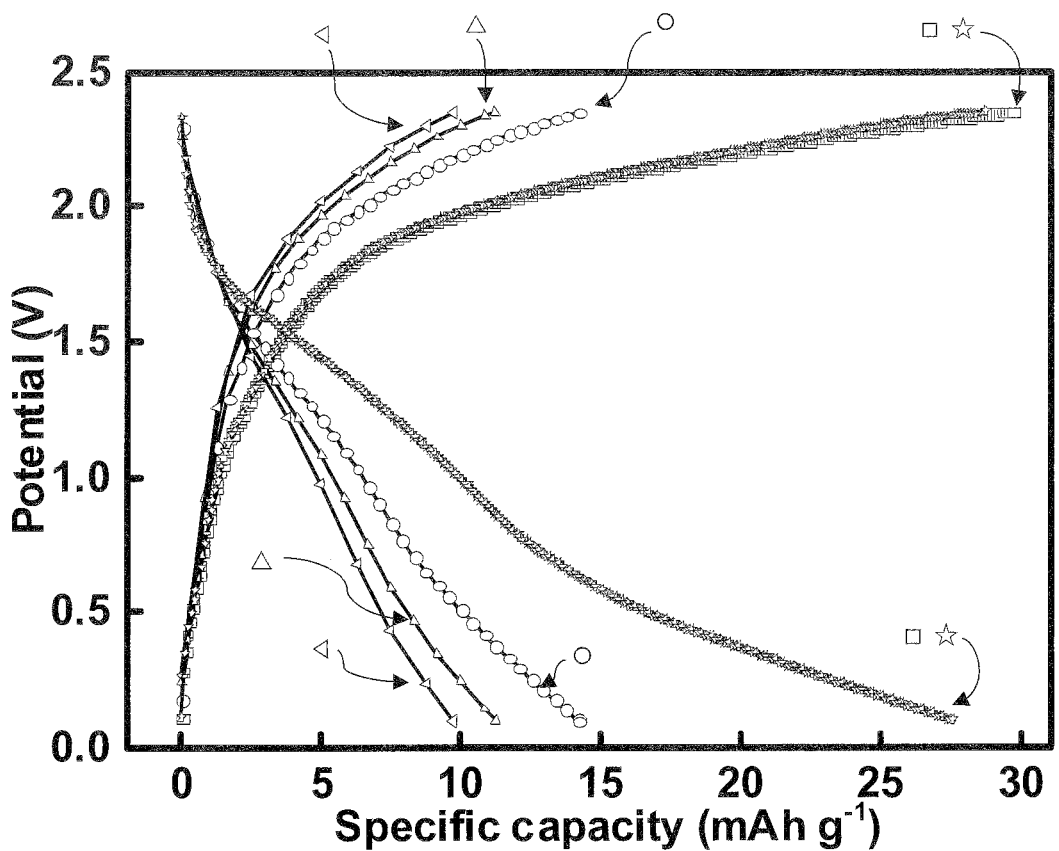

FIG. 12 shows charge/discharge curves for an aluminium ion cell comprising a cathode with a 1:1 ratio (by weight) of $MnO_2$ and hexagonal boron nitride at current densities of 50 mA/g (□), 500 mA/g (○), 1000 mA/g (Δ), 1500 mA/g (◁), and at 50 mA/g at the 100th cycle (☆).

Figure 13:
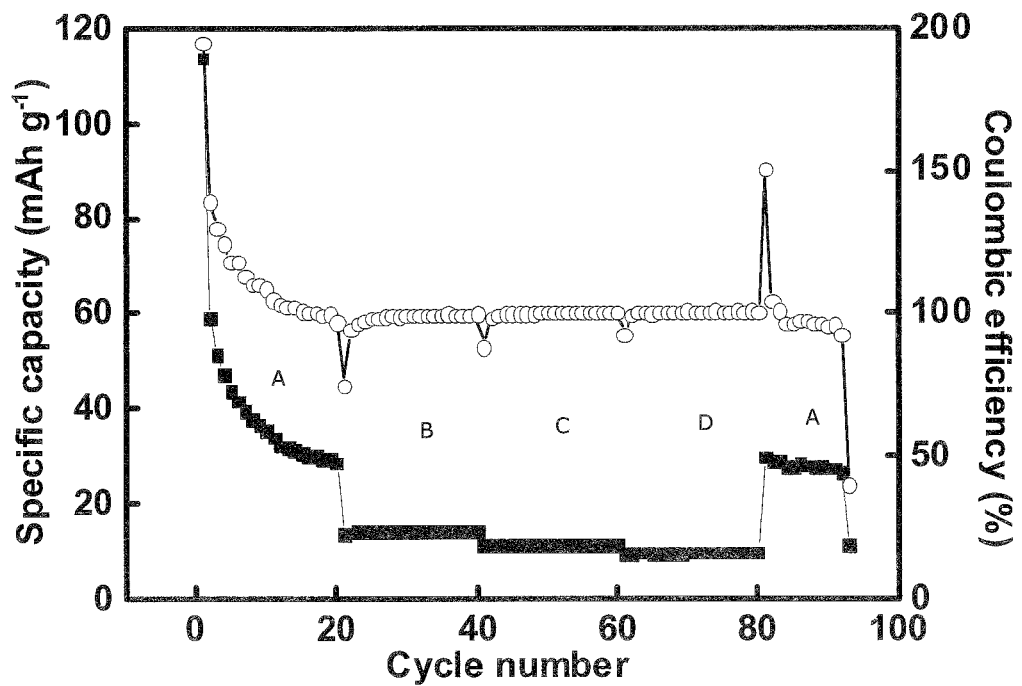

FIG. 13 shows a plot of the specific capacity and coulombic efficiency over repeated charge/discharge cycles, shifting at approximately 20 cycle intervals from 50 mA/g (A) to 500 mA/g (B) to 1 A/g (C) to 1.5 A/g (D) and then back to 50 mA/g (A), for an aluminium ion cell comprising a cathode with a 1:1 ratio (by weight) of $MnO_2$ and hexagonal boron nitride. Symbol ■ denotes the specific capacity and symbol ○ represents the coulombic efficiency.

Figure 14:
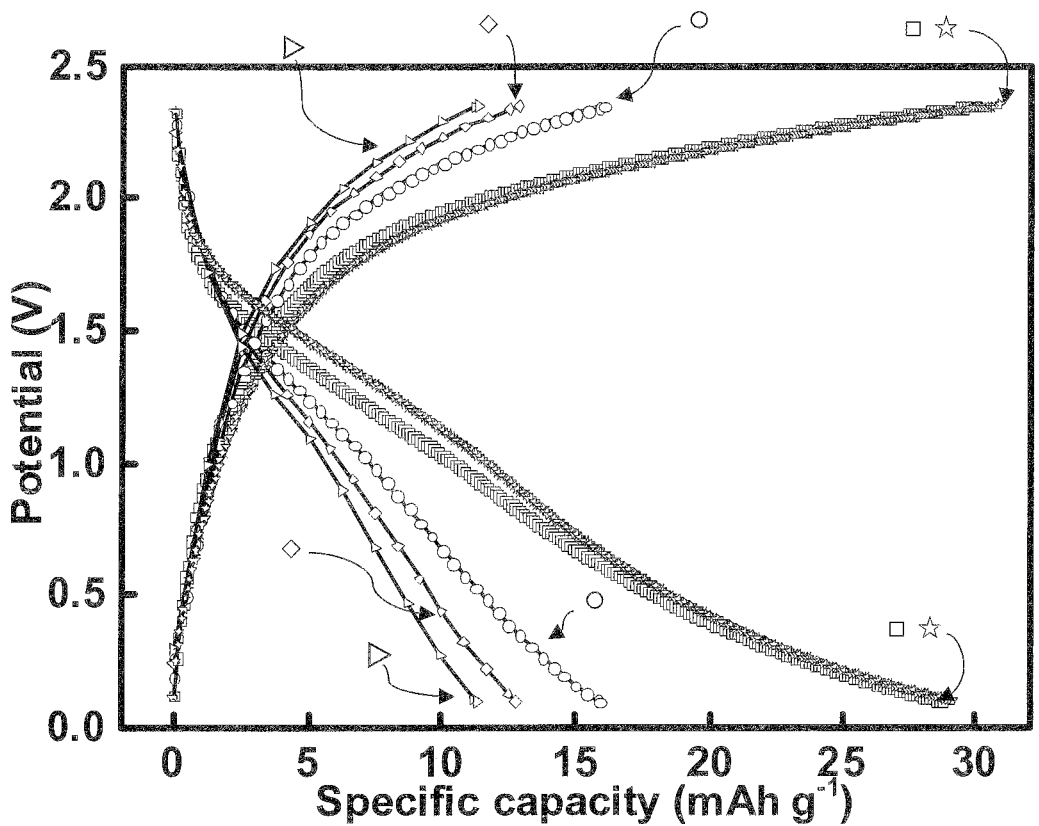

FIG. 14 shows charge/discharge curves for an aluminium ion cell comprising a cathode with a 1:1 ratio (by weight) of $MnO_2$ and carbon nitride at current densities of 50 mA/g (□), 500 mA/g (○), 1000 mA/g (◇), 1500 mA/g (▷), and at 50 mA/g at the $100^{th}$ cycle (☆).

Figure 15:
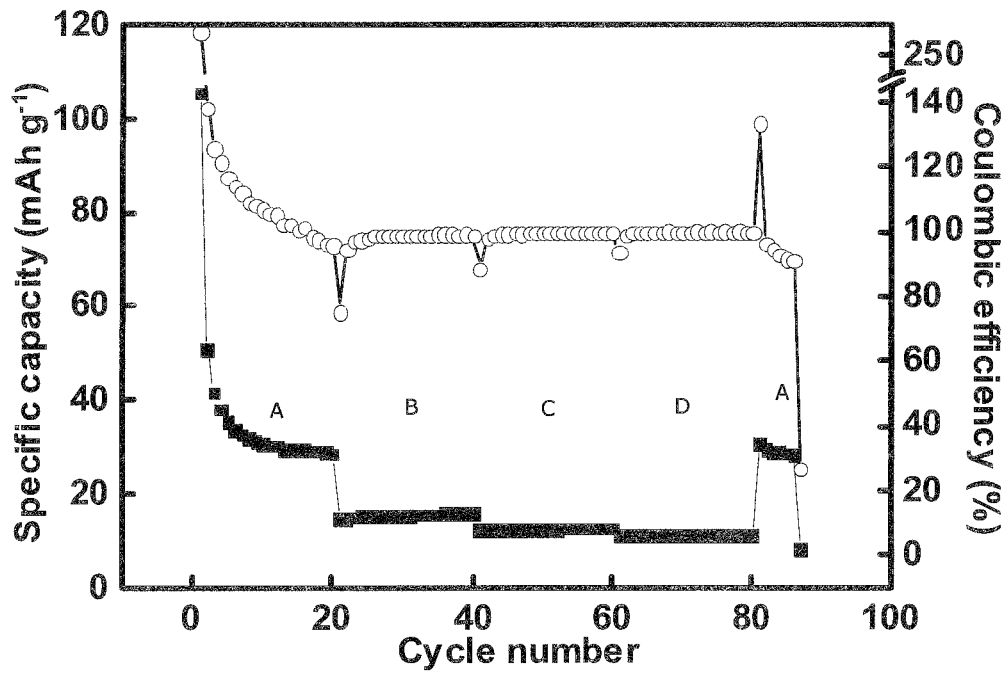

FIG. 15 shows a plot of the specific capacity and coulombic efficiency over repeated charge/discharge cycles, shifting at approximately 20 cycle intervals from 50 mA/g (A) to 500 mA/g (B) to 1 A/g (C) to 1.5 A/g (D) and then back to 50 mA/g (A), for an aluminium ion cell comprising a cathode with a 1:1 ratio (by weight) of $MnO_2$ and carbon nitride. Symbol ■ denotes the specific capacity and symbol ○ represents the coulombic efficiency.

Figure 16:
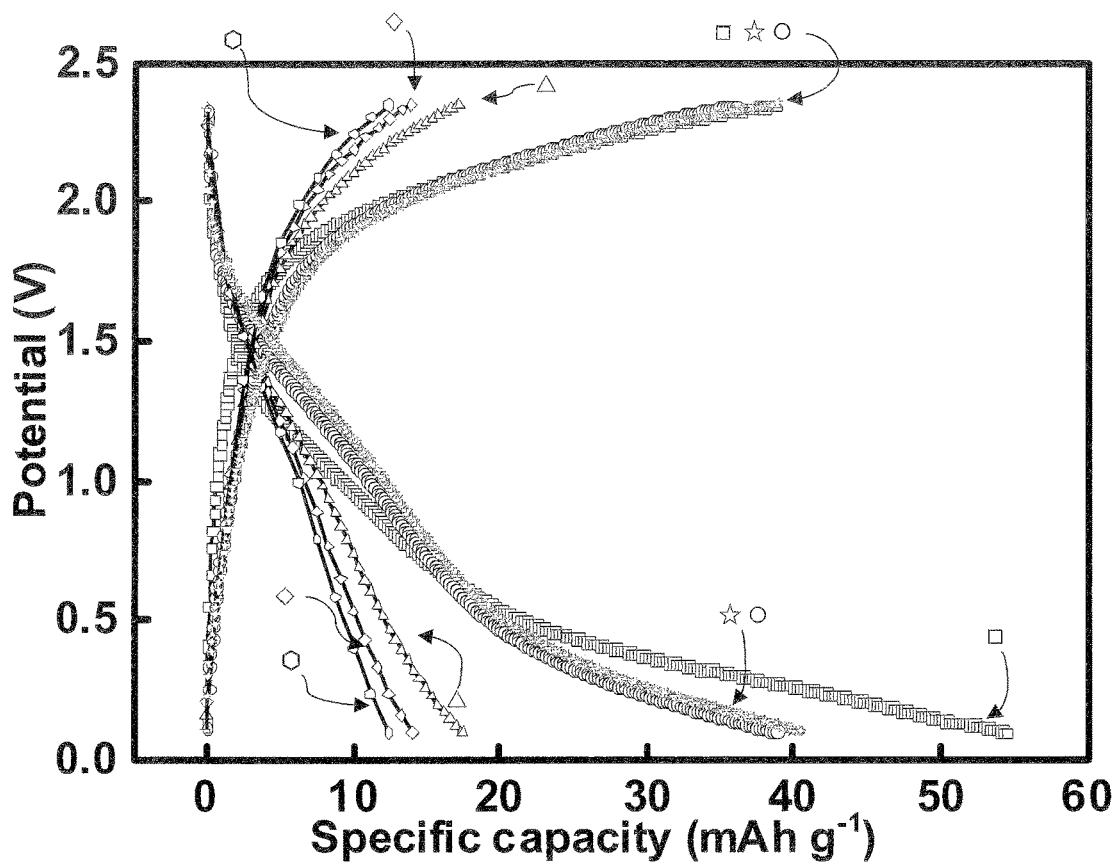

FIG. 16 shows charge/discharge curves for an aluminium ion cell comprising a cathode with a 1:1 ratio (by weight) of $MnO_2$ and silicon nitride at current densities of 50 mA/g (□), 500 mA/g (Δ), 1000 mA/g (◇), 1500 mA/g (○), and at 50 mA/g at the $20^{th}$ cycle (○̃) and 50 mA/g at the $100^{th}$ cycle (☆).

Figure 17:
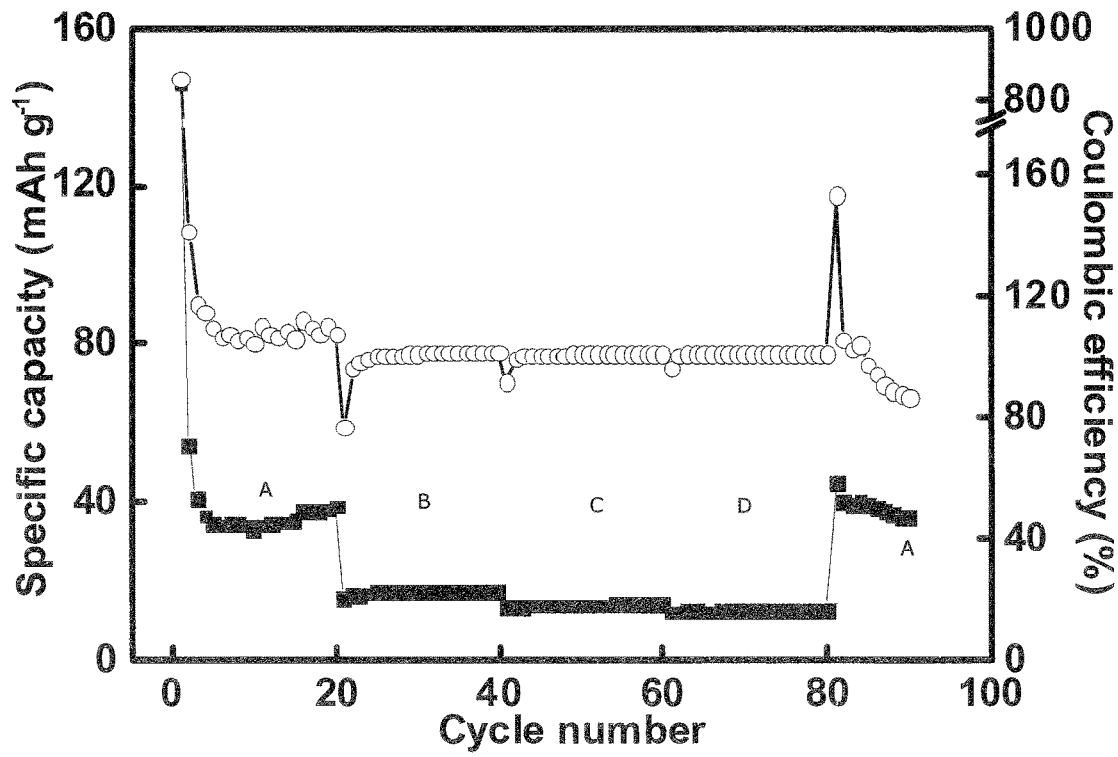

FIG. 17 shows a plot of the specific capacity and coulombic efficiency over repeated charge/discharge cycles, shifting at approximately 20 cycle intervals from 50 mA/g (A) to 500 mA/g (B) to 1 A/g (C) to 1.5 A/g (D) and then back to 50 mA/g (A), for an aluminium ion cell comprising a cathode with a 1:1 ratio (by weight) of $MnO_2$ and silicon nitride. Symbol ■ denotes the specific capacity and symbol ○ represents the coulombic efficiency.

Figure 18:
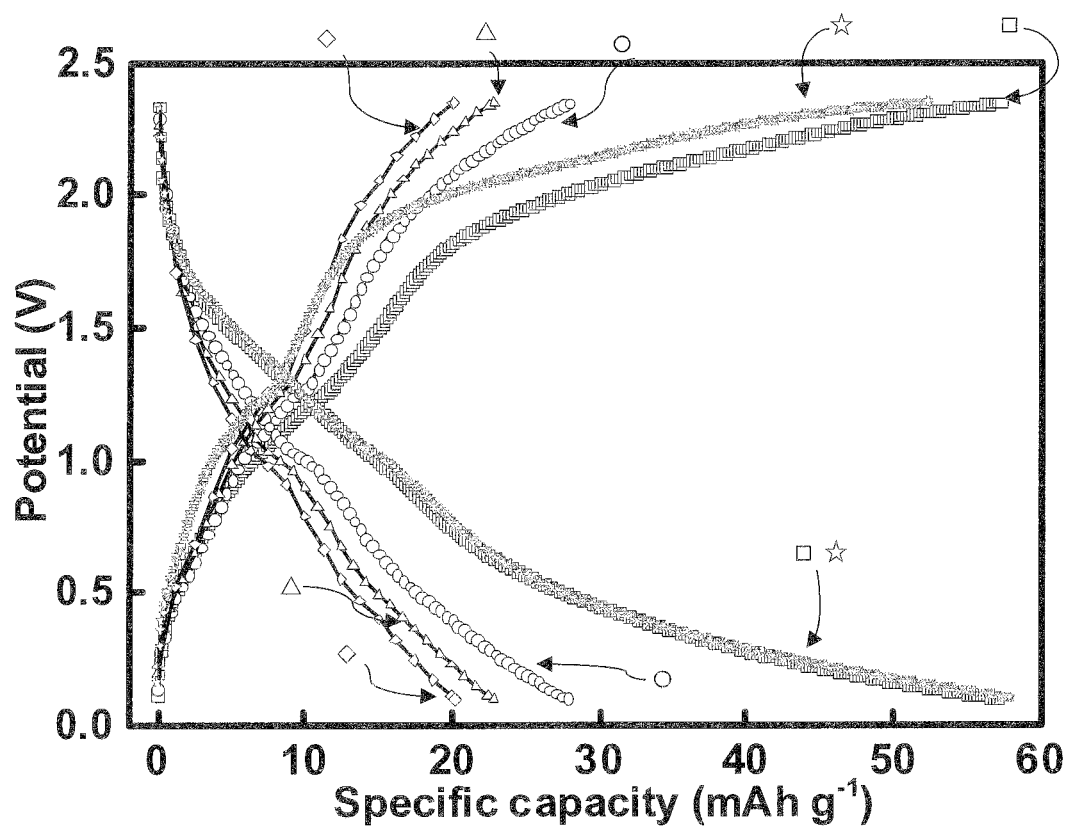

FIG. 18 shows charge/discharge curves for an aluminium ion cell comprising a cathode with a 1:1 ratio (by weight) of $TiO_2$ and hexagonal boron nitride at current densities of 50 mA/g (□), 500 mA/g (○), 1000 mA/g (Δ), 1500 mA/g (◇), and at 50 mA/g at the 100th cycle (☆).

Figure 19:
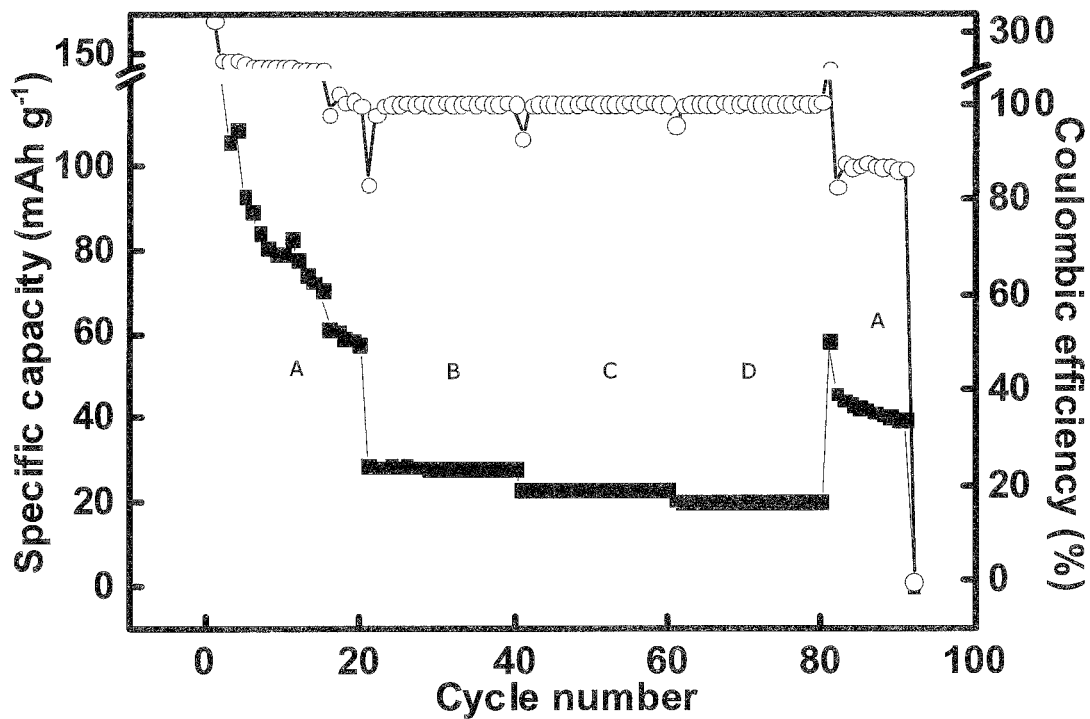

FIG. 19 shows a plot of the specific capacity and coulombic efficiency over repeated charge/discharge cycles, shifting at approximately 20 cycle intervals from 50 mA/g (A) to 500 mA/g (B) to 1 A/g (C) to 1.5 A/g (D) and then back to 50 mA/g (A), for an aluminium ion cell comprising a cathode with a 1:1 ratio (by weight) of $TiO_2$ and hexagonal boron nitride. Symbol ■ denotes the specific capacity and symbol ○ represents the coulombic efficiency.

Figure 20:
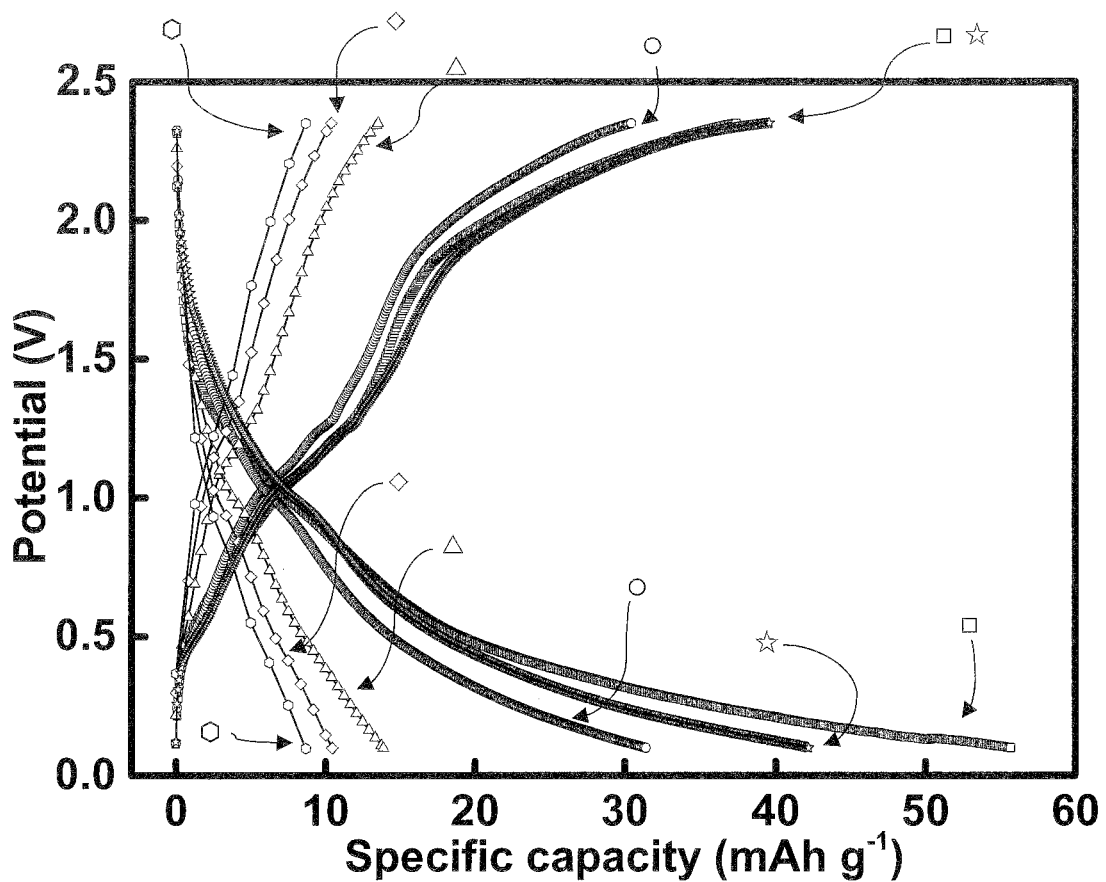

FIG. 20 shows charge/discharge curves for an aluminium ion cell comprising a cathode with a 1:1 ratio (by weight) of $TiO_2$ and carbon nitride at current densities of 50 mA/g (□), 500 mA/g (Δ), 1000 mA/g (◇), 1500 mA/g (○), and at 50 mA/g at the $20^{th}$ cycle (○̃) and 50 mA/g at the $100^{th}$ cycle (☆).

Figure 21:
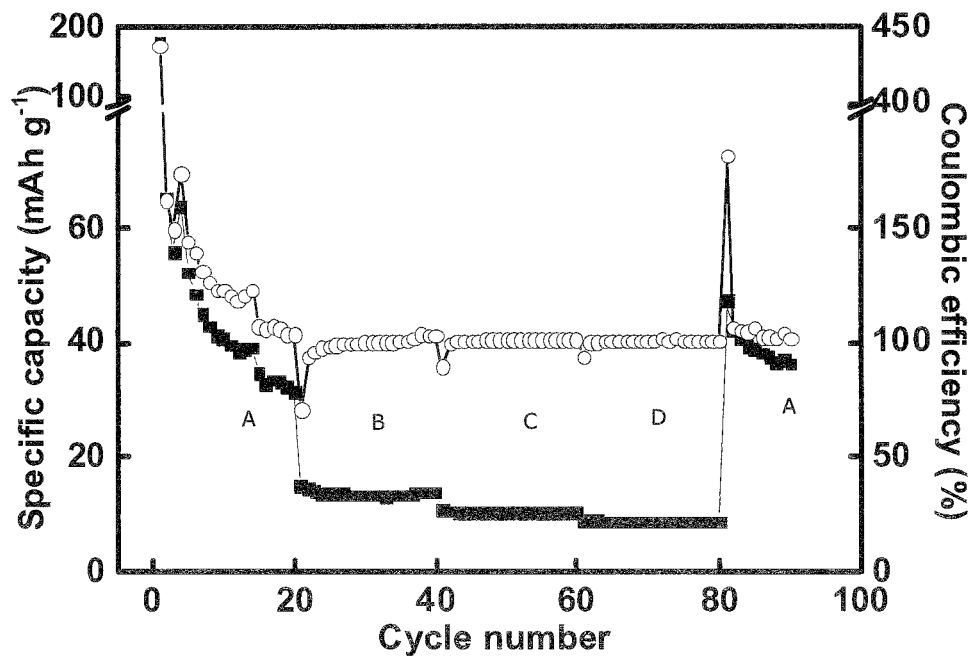

FIG. 21 shows a plot of the specific capacity and coulombic efficiency over repeated charge/discharge cycles, shifting at approximately 20 cycle intervals from 50 mA/g (A) to 500 mA/g (B) to 1 A/g (C) to 1.5 A/g (D) and then back to 50 mA/g (A), for an aluminium ion cell comprising a cathode with a 1:1 ratio (by weight) of $TiO_2$ and carbon nitride. Symbol ■ denotes the specific capacity and symbol ○ represents the coulombic efficiency.

Figure 22:
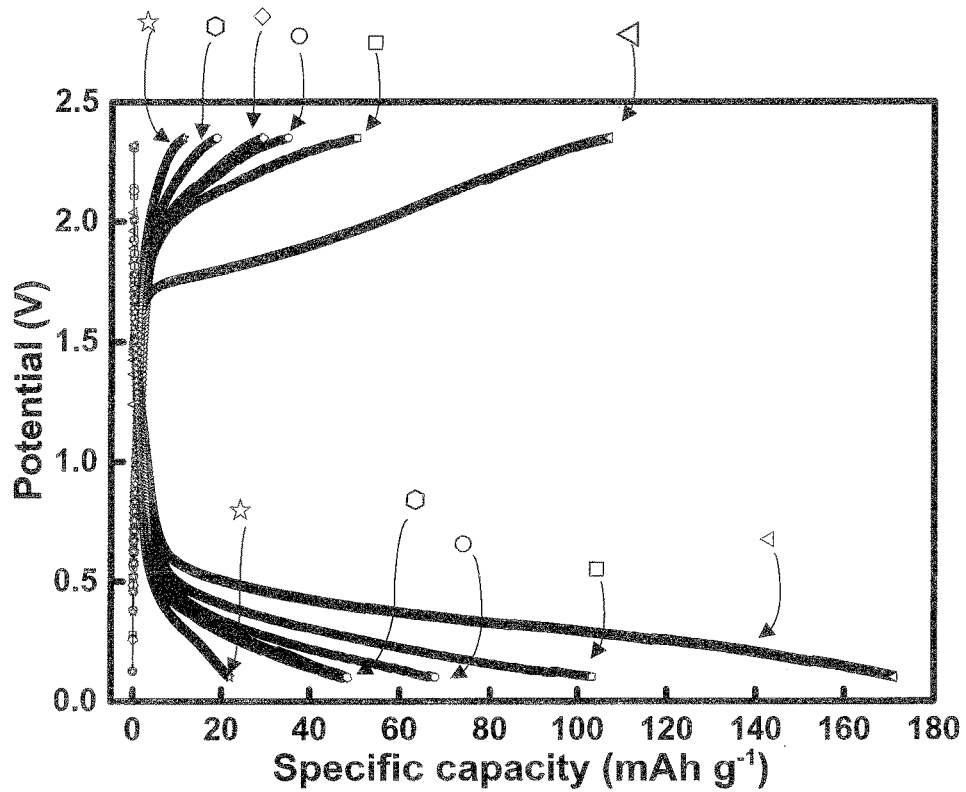

FIG. 22 shows charge/discharge curves for aluminium ion cells comprising cathodes with an active material composition of $B_2O_3$ and hexagonal boron nitride in $B_2O_3$: hBN ratios of 75:25 (☆), 80:20 (○), 85:15 (◇), 90:10 (○̃), 95:5 (◁) (by weight) and 100% $B_2O_3$ (□) respectively.

Figure 23:
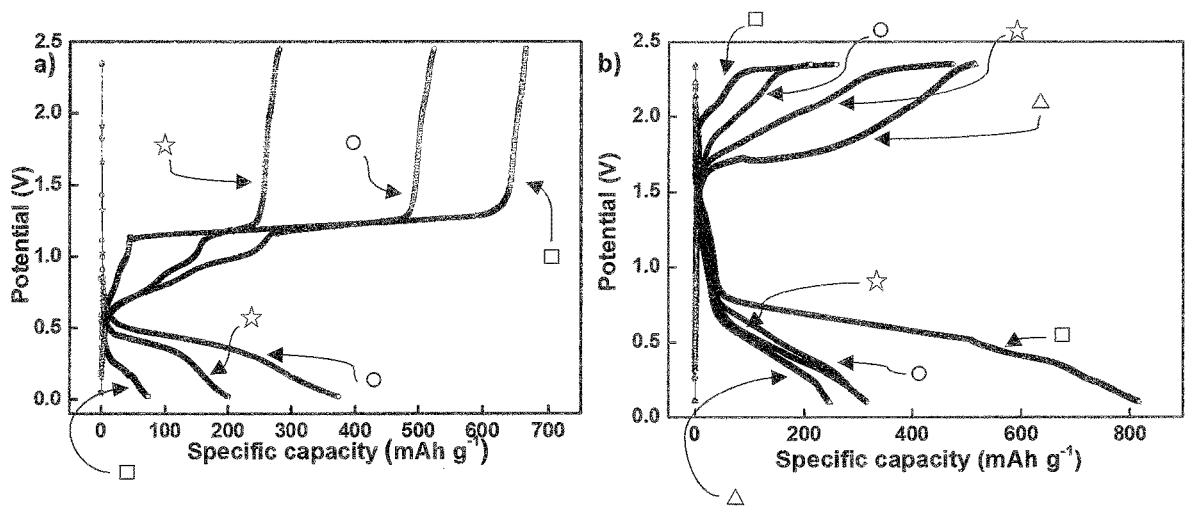

FIG. 23 (a) shows charge/discharge cycles of aluminium ion cells comprising $B_2O_3$ as the active material at a current rate of 50 mA/g for the 1st cycle (□), 2nd cycle (○) and $15^{th}$ cycle (☆). b) shows charge/discharge curves for an aluminium ion cell comprising a cathode with active material of $B_2O_3$/hBN in a 1:1 ratio (by weight) at current rate of 50 mA/g at the $1^{st}$ cycle (□), $2^{nd}$ cycle (○), $10^{th}$ cycle (Δ) and $20^{th}$ cycle (☆).

Figure 24:
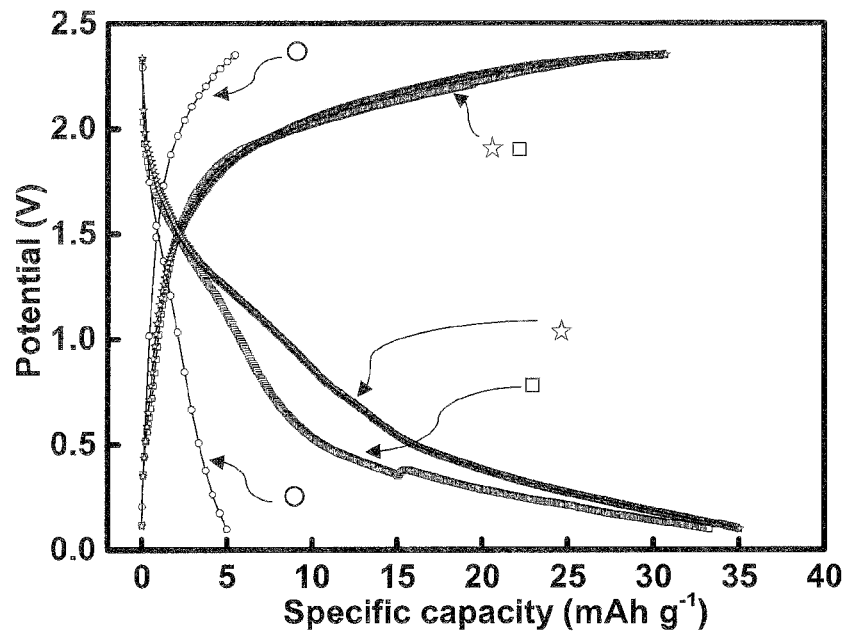

FIG. 24 shows charge/discharge curves for an aluminium ion cell comprising a cathode with a boric anhydride: hexagonal boron nitride ratio of 5:95 (by weight) at current densities of 50 mA/g (□) and 1000 mA/g (○), and at 50 mA/g at the $100^{th}$ cycle (☆).

Figure 25:
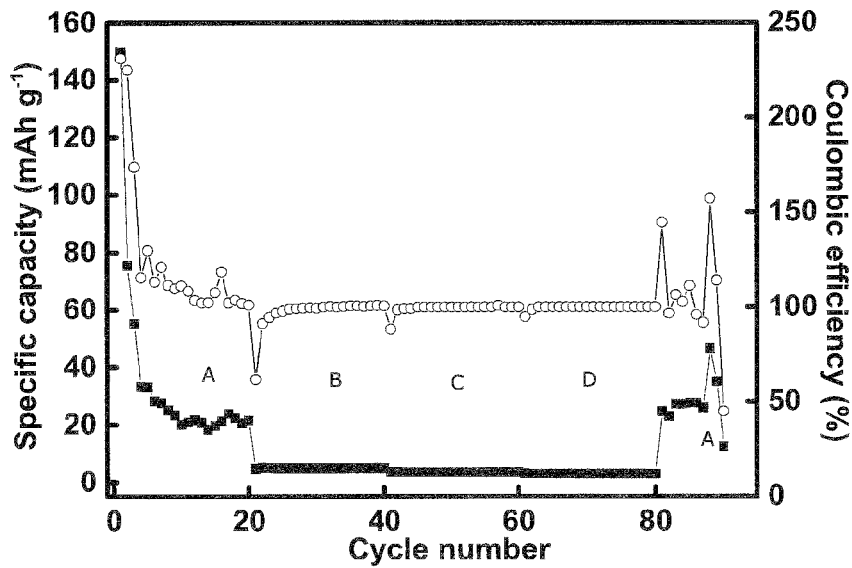

FIG. 25 shows a plot of the specific capacity and coulombic efficiency over repeated charge/discharge cycles, shifting at approximately 20 cycle intervals from 50 mA/g (A) to 500 mA/g (B) to 1 A/g (C) to 1.5 A/g (D) and then back to 50 mA/g (A), for an aluminium ion cell comprising a cathode containing a boric anhydride:hexagonal boron nitride ratio of 5:95 (by weight).

Figure 26:
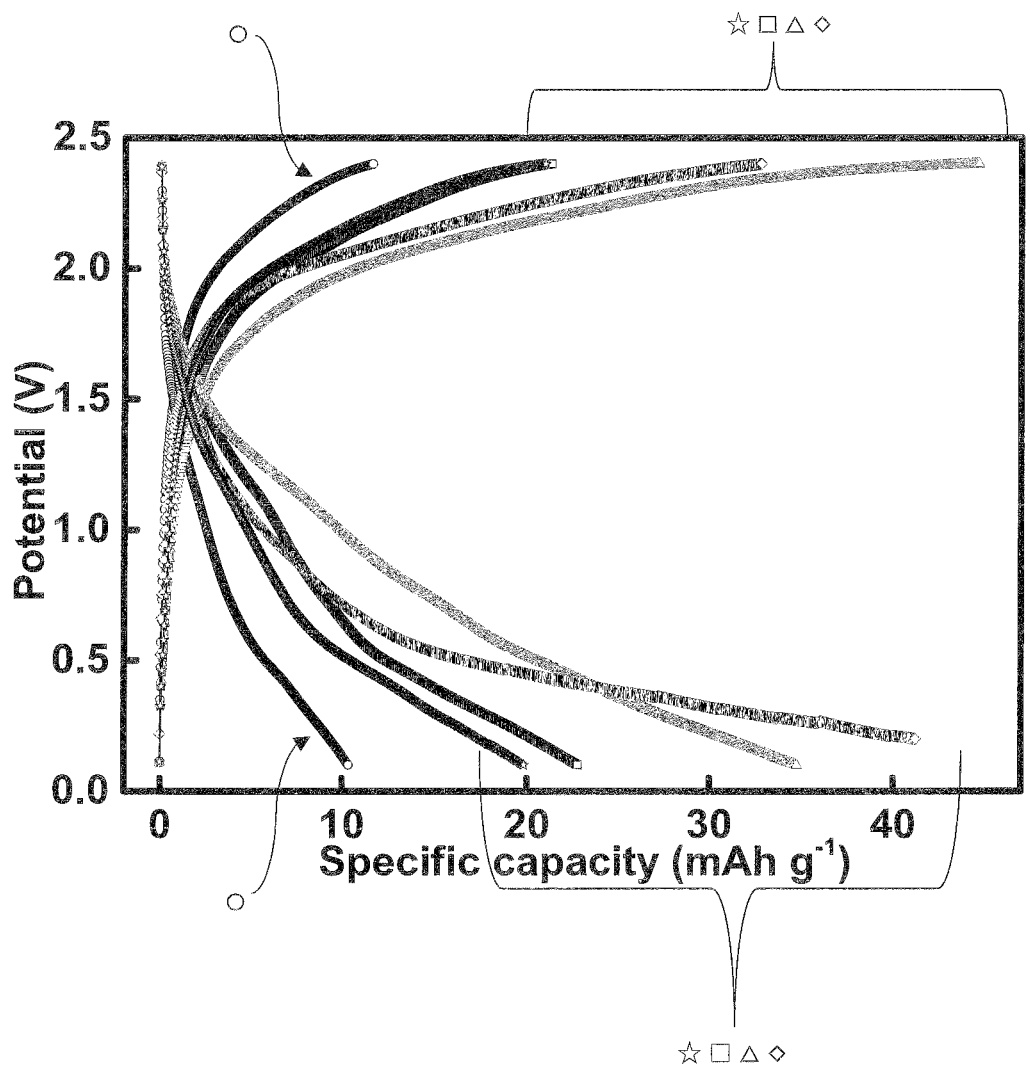

FIG. 26 shows charge/discharge curves for an aluminium ion cell comprising a cathode containing hexagonal boron nitride (100% of the active material) at current densities of 50 mA/g for the first few cycles (☆□Δ◇) and 500 mA/g (○).

Figure 27:
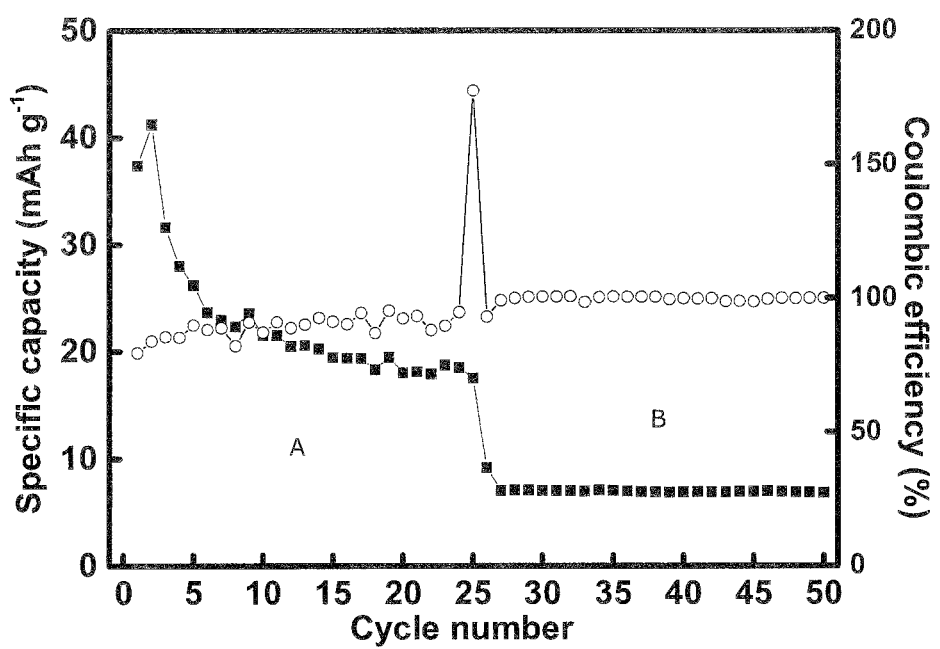

FIG. 27 shows a plot of the specific capacity and coulombic efficiency over repeated charge/discharge cycles, in which approximately the first 25 cycles were at 50 mA/g (A), shifting to 500 mA/g for a further approximately 25 cycles (B), for an aluminium ion cell comprising a cathode containing hexagonal boron nitride (100% of the active material). Symbol ■ denotes the specific capacity and symbol ○ represents the coulombic efficiency.

DEFINITIONS

"Main group elements" means the elements of groups 1 and 2 (s-block), and groups 13 to 17 (p-block, excluding the noble gases) of the periodic table.

"Group 13 elements" means boron, aluminium, gallium, indium and tellurium.

"Chalcogenides" means oxides, sulfides, selenides and tellurides.

"Active material" with respect to cathode materials in a cell, means the materials in the cathode that react during discharging of the cell to, in part, generate an electromotive force.

DETAILED DESCRIPTION

Aluminium ion batteries are promising alternatives to other ion batteries such as lithium ion batteries. The present invention relates to cathodes for use in aluminium ion batteries. Ion batteries work using a reversible electrochemical deposition and dissolution process. During discharge of an ion battery, ions may be inserted into the interstitial gaps between the layers of material forming the cathode and electrons flow from the anode to the cathode to provide an EMF (electromotive force) to drive a load. This process is reversed during charging of the battery i.e. ions are removed from the interstitial gaps between the layers of material forming the cathode and electrons flow from the cathode to the anode.

The present inventors have surprisingly found that nitride compounds of the main group elements show surprisingly good activity as cathode active materials for use, and when used in aluminium ion batteries.

The present inventors have surprisingly found that boron oxide compounds, particularly boric anhydride, show surprisingly good activity as cathode active materials for use, and when used in aluminium ion batteries.

The present inventors have further surprisingly found that the combination of nitride compounds of the main group elements, and Group 1-13 oxides, show surprisingly good activity as cathode active materials for use, and when used in aluminium ion batteries.

In particular, the present inventors have surprisingly found that the combination of boron nitride and oxides of boron show surprisingly good activity as cathode active materials for use, and when used in aluminium ion batteries. Further, the present inventors have surprisingly found that the combination of hexagonal boron nitride and boric anhydride show surprisingly good activity as cathodes for use, and when used in aluminium ion batteries.

Figure 1:
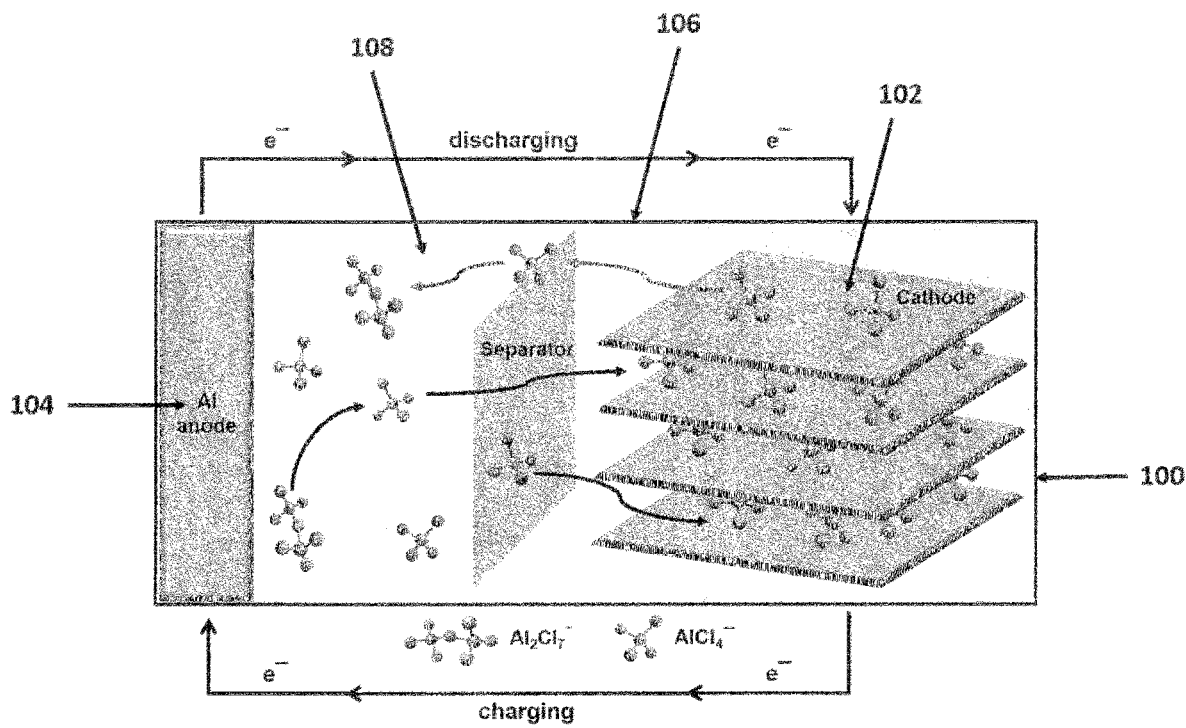
FIG. 1 is a representative schematic of an aluminium ion cell, comprising $AlCl_3$/imidazolium chloride ionic liquid electrolyte, according to an embodiment of the present invention showing flow of electrons during the charging and discharge cycles of the battery.
Figure 2:
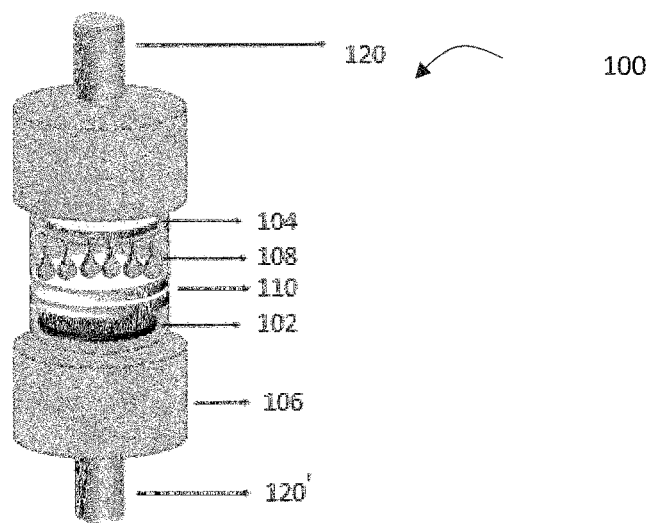
FIG. 2 shows a schematic representation of a lab prototype. It shows the arrangement of electrodes inside a cell.
Figure 3:
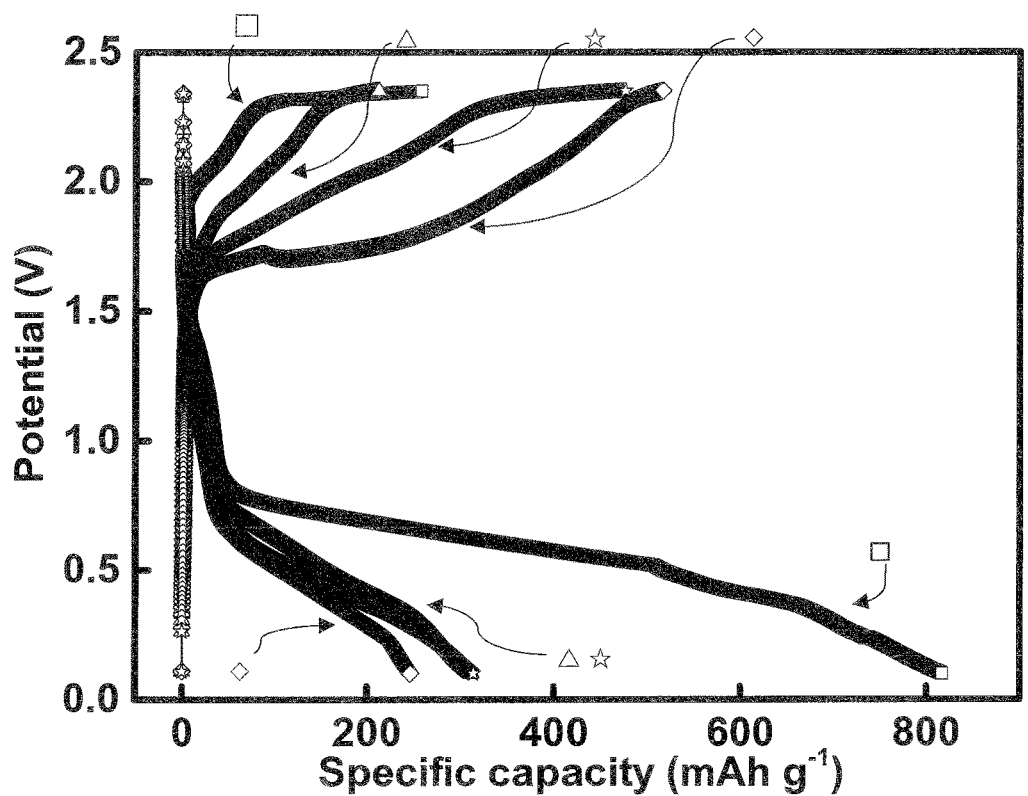
FIG. 3 shows charge/discharge curves for an aluminium ion cell comprising a cathode with a 1:1 ratio (by weight) of $B_2O_3$ and hexagonal boron nitride at the $1^{st}$ (□), $2^{nd}$ (Δ), $10^{th}$ (◇) and $20^{th}$ (☆) cycles, at 50 mA/g.
Figure 4:
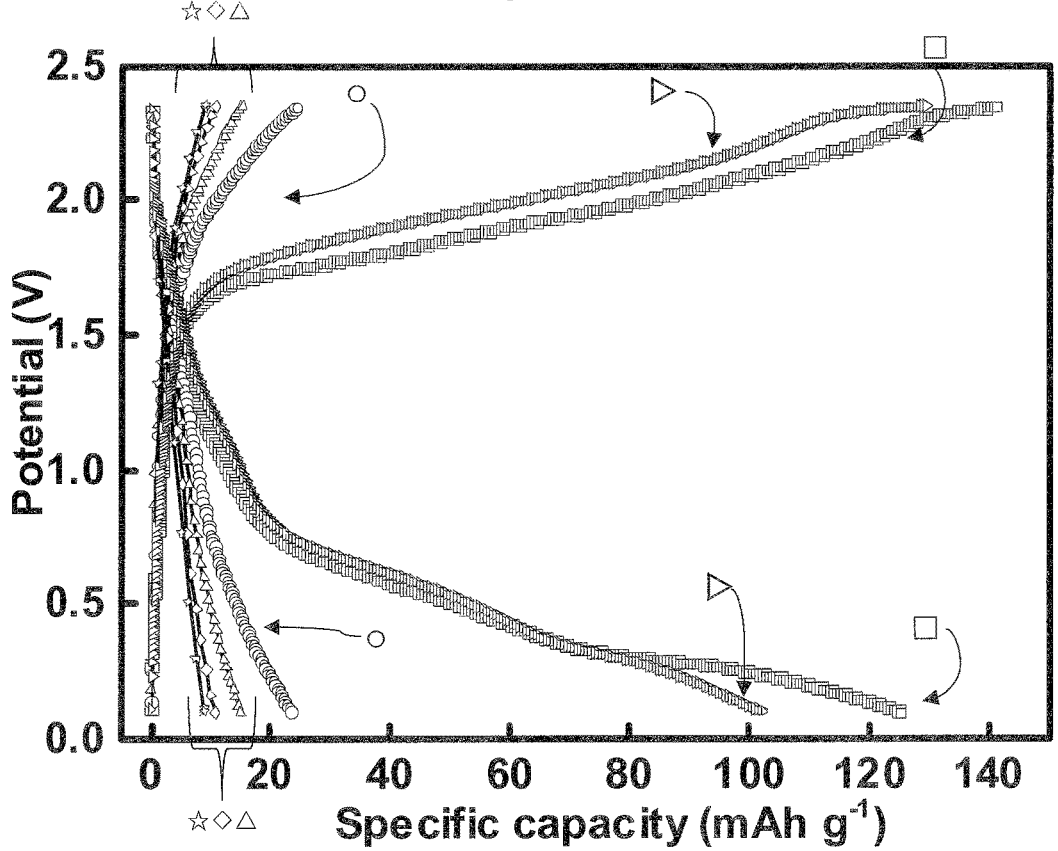
FIG. 4 shows charge/discharge curves for an aluminium ion cell comprising a cathode with a 1:1 ratio (by weight) of $B_2O_3$ and hexagonal boron nitride at current densities of 50 mA/g (□), 500 mA/g (○), 900 mA/g (Δ), 1000 mA/g (◇), 1500 mA/g (☆) and at 50 mA/g at the $100^{th}$ cycle (▷).
Figure 5:
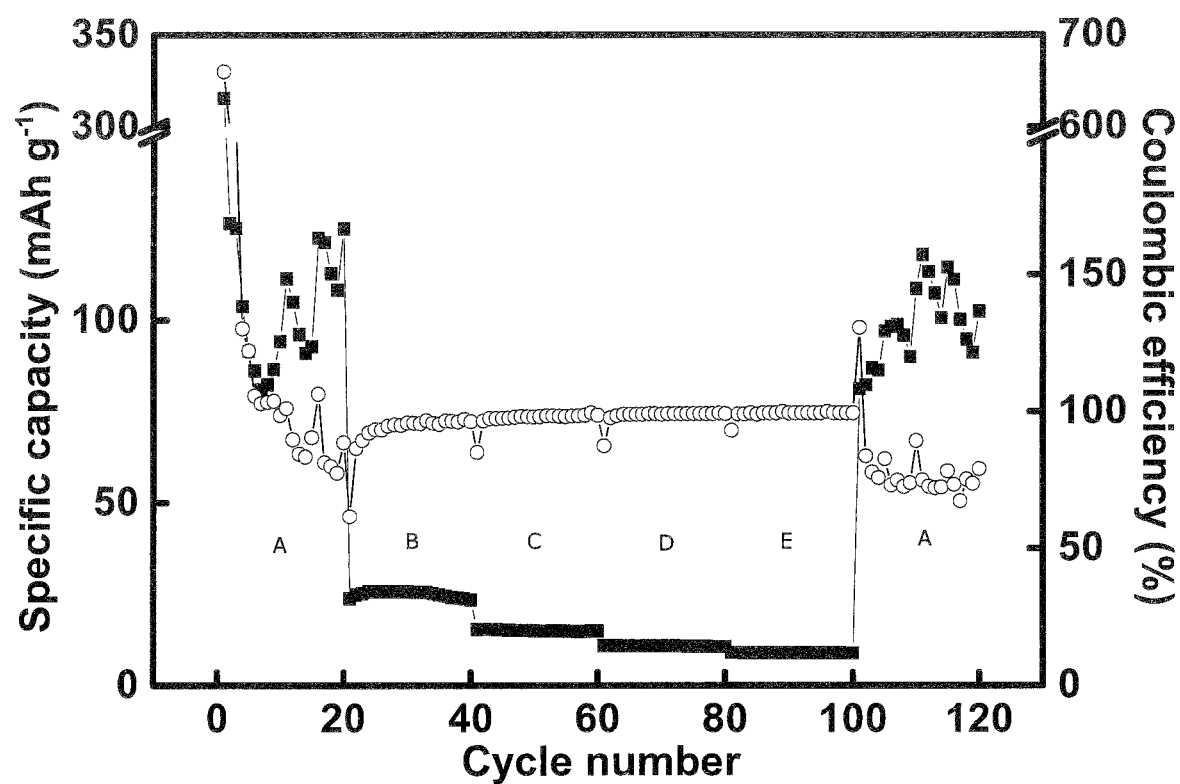
FIG. 5 shows a plot of the specific capacity and coulombic efficiency over repeated charge/discharge cycles, shifting at approximately 20 cycle intervals from 50 mA/g (A) to 500 mA/g (B) to 900 mA/g (C) to 1 A/g (D) to 1.5 A/g (E) and then back to 50 mA/g (A), for an aluminium ion cell comprising a cathode with a 1:1 ratio (by weight) of $B_2O_3$ and hexagonal boron nitride. Symbol ■ denotes the specific capacity and symbol ○ represents the coulombic efficiency.

Referring to FIGS. 1 and 2 which are a representative schematic of a battery (100) according to an embodiment of the present invention. The battery (100) is an aluminium ion battery having a cathode (102) and anode (104) which are provided within a housing (106). The housing (106) may be any housing suitable for use in battery and will be readily understood by those of skill in the art. For example, suitable housings may comprise, but are not limited only to: coin cells, pouch cells, cylindrical cells, prismatic cells. An electrolyte (108) in the form of an ionic liquid is provided in the housing (106) and provides an electrical connection between the cathode (102) and the anode (104) when the battery (100) is being charged or discharged.

The battery (100) also includes a separator (110) which in structured and/or arranged to prevent the anode and cathode directly contacting each other. The separator (110) is preferably glass microfibers which are mounted in the housing (106). However, those of skill in the art will realise that any material or structure that is electrically insulating and can prevent the cathode and anode touching.

The cathode (102) and the anode (104) each have a terminal, which are indicated as (120) and (120') respectively. The terminals (120 and 120') (FIG. 2) such as molybdenum rods, facilitate attaching the battery to an external load or charging device.

Further embodiments of the battery (100) will become clearer from the following description of specific components thereof.

Referring to FIGS. 3 to 5, and FIG. 23(b), an aluminium ion battery cell was prepared in accordance with the method described in the Examples, comprising a cathode with active materials consisting of a 1:1 ratio of boric anhydride and hexagonal boron nitride (Cell 4 in Table 1). Cycling the cell at 50 mA/g shows a specific capacity around 220 mAh/g at a current density of 50 mA/g, and stabilising between about 10-25 mAh/g for current densities of 500-1500 mA/g.

Figure 6:
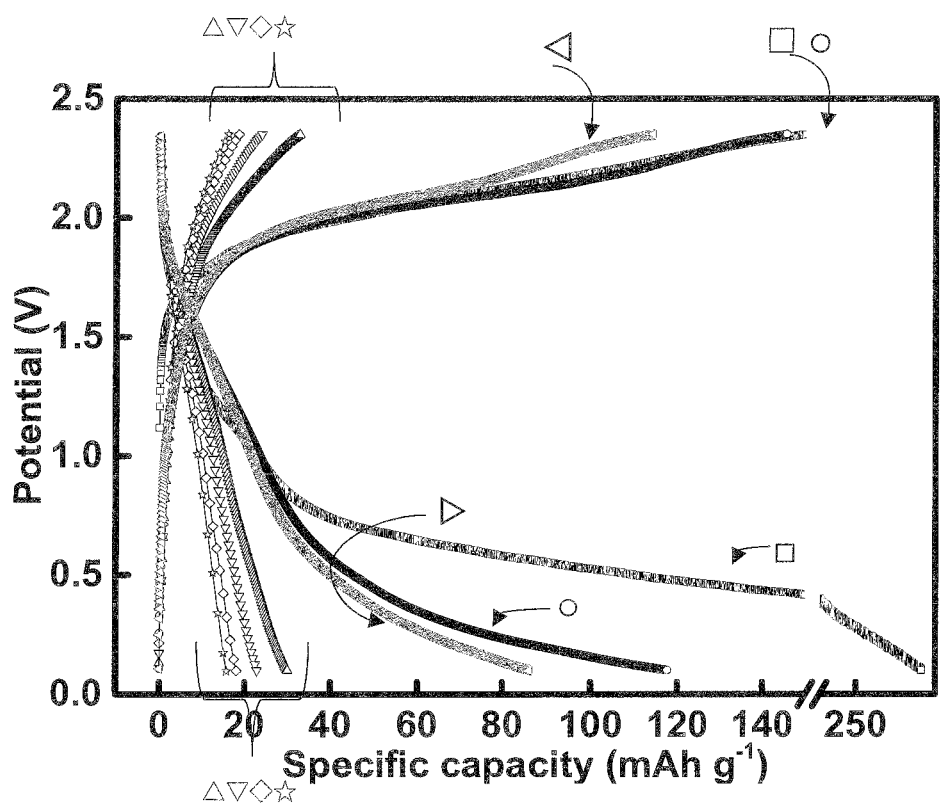
FIG. 6 shows charge/discharge curves for an aluminium ion cell comprising a cathode with a 1:1 ratio (by weight) of $B_2O_3$ and carbon nitride ($C_3N_4$) at current densities of 50 mA/g (□), 500 mA/g (Δ), 900 mA/g (▽), 1000 mA/g (◇), 1500 mA/g (☆), 50 mA/g at the $20^{th}$ cycle (○) and 50 mA/g at the $100^{th}$ cycle (◁).
Figure 7:
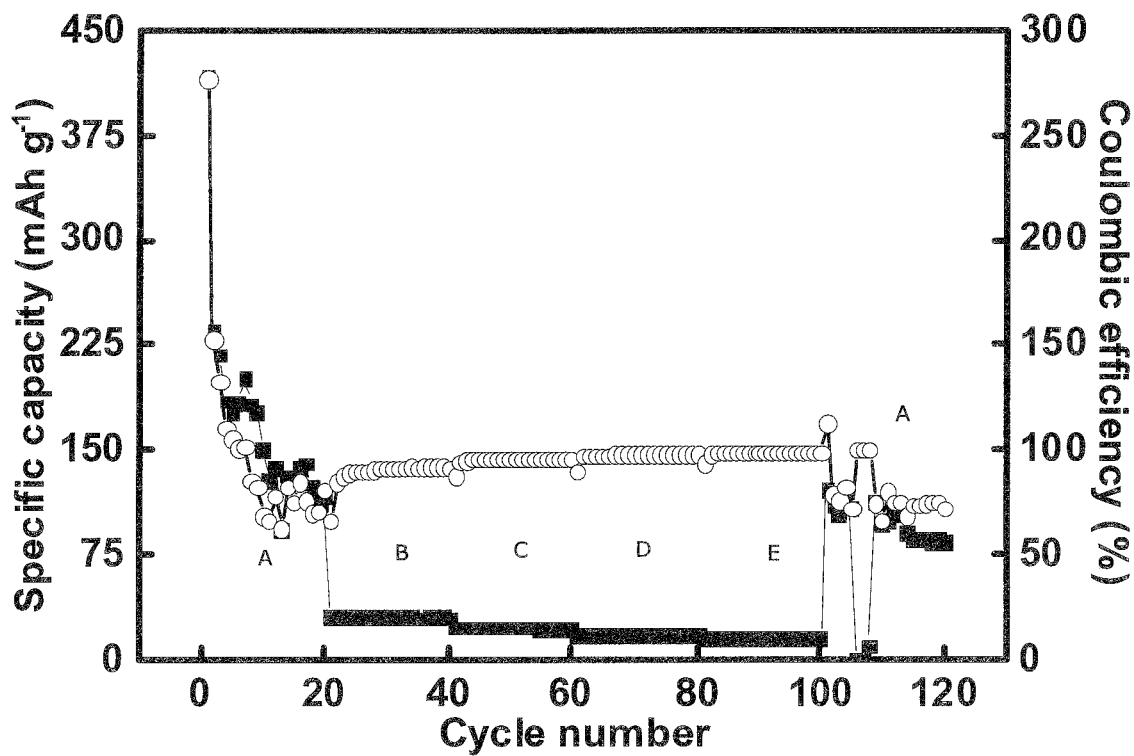
FIG. 7 shows a plot of the specific capacity and coulombic efficiency over repeated charge/discharge cycles, shifting at approximately 20 cycle intervals from 50 mA/g (A) to 500 mA/g (B) to 900 mA/g (C) to 1 A/g (D) to 1.5 A/g (E) and then back to 50 mA/g (A) for an aluminium ion cell comprising a cathode with a 1:1 ratio (by weight) of $B_2O_3$ and carbon nitride ($C_3N_4$). Symbol ■ denotes the specific capacity and symbol ○ represents the coulombic efficiency.

Referring to FIGS. 6 and 7, an aluminium ion battery cell was prepared in accordance with the method described in the Examples, comprising a cathode with active materials consisting of a 1:1 ratio of boric anhydride and carbon nitride, $C_3N_4$ (Cell 10 in Table 1). Cycling the cell at 50 mA/g shows coulombic efficiency stabilising at approximately 100%, and specific capacity around 90-120 mAh/g at a current density of 50 mA/g, and stabilising between about 10-30 mAh/g for current densities of 500-1500 mA/g.

Figure 8:
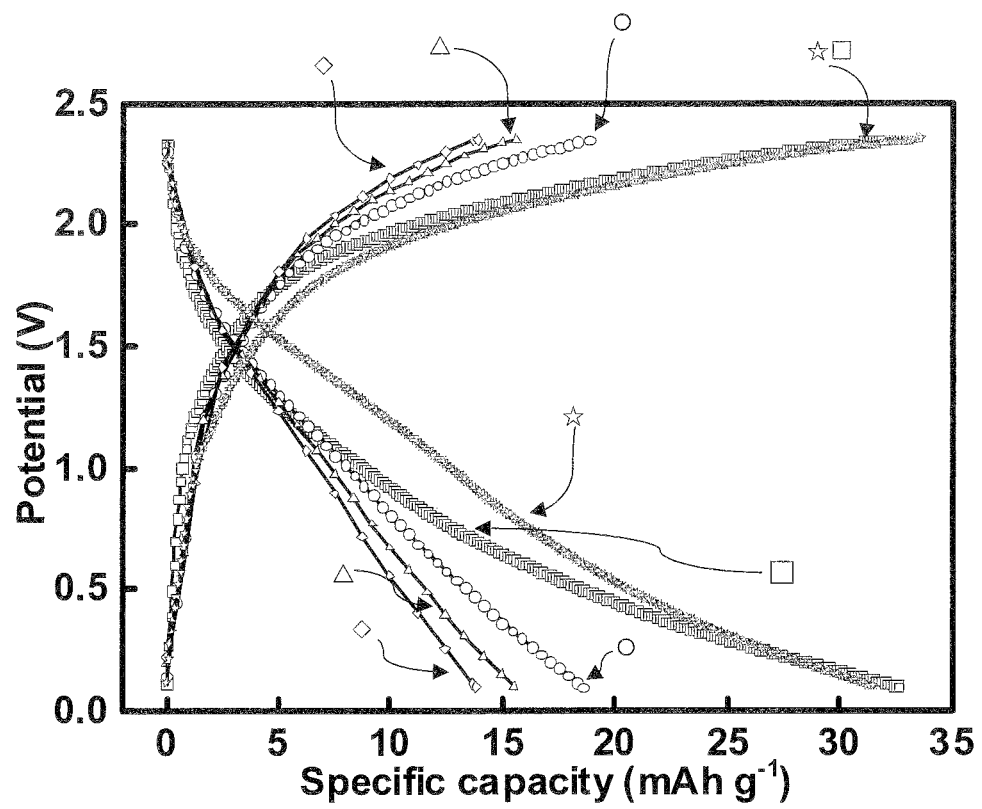
FIG. 8 shows charge/discharge curves for an aluminium ion cell comprising a cathode with a 1:1 ratio (by weight) of $B_2O_3$ and AlN aluminium nitride at current densities of 50 mA/g (□), 500 mA/g (○), 1000 mA/g (Δ), 1500 mA/g (◇), and at 50 mA/g at the 100th cycle (☆).
Figure 9:
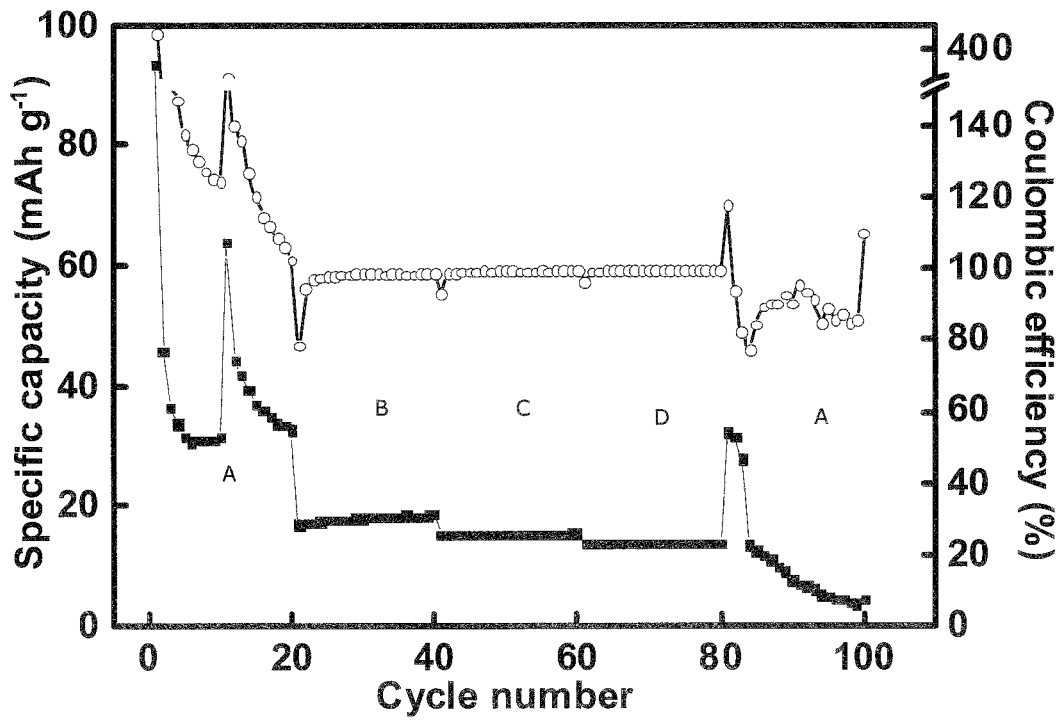
FIG. 9 shows a plot of the specific capacity and coulombic efficiency over repeated charge/discharge cycles, shifting at approximately 20 cycle intervals from 50 mA/g (A) to 500 mA/g (B) to 1 A/g (C) to 1.5 A/g (D) and then back to 50 mA/g (A), for an aluminium ion cell comprising a cathode with a 1:1 ratio (by weight) of $B_2O_3$ and aluminium nitride (AlN). Symbol ■ denotes the specific capacity and symbol ○ represents the coulombic efficiency.

Referring to FIGS. 8 and 9, an aluminium ion battery cell was prepared in accordance with the method described in the Examples, comprising a cathode with active materials consisting of a 1:1 ratio of boric anhydride and aluminium nitride, AlN (Cell 11 in Table 1). Cycling the cell at 50 mA/g shows specific capacity around 32-34 mAh/g at a current density of 50 mA/g, and stabilising at about 15-20 mAh/g for current densities of 500-1500 mA/g.

Figure 10:
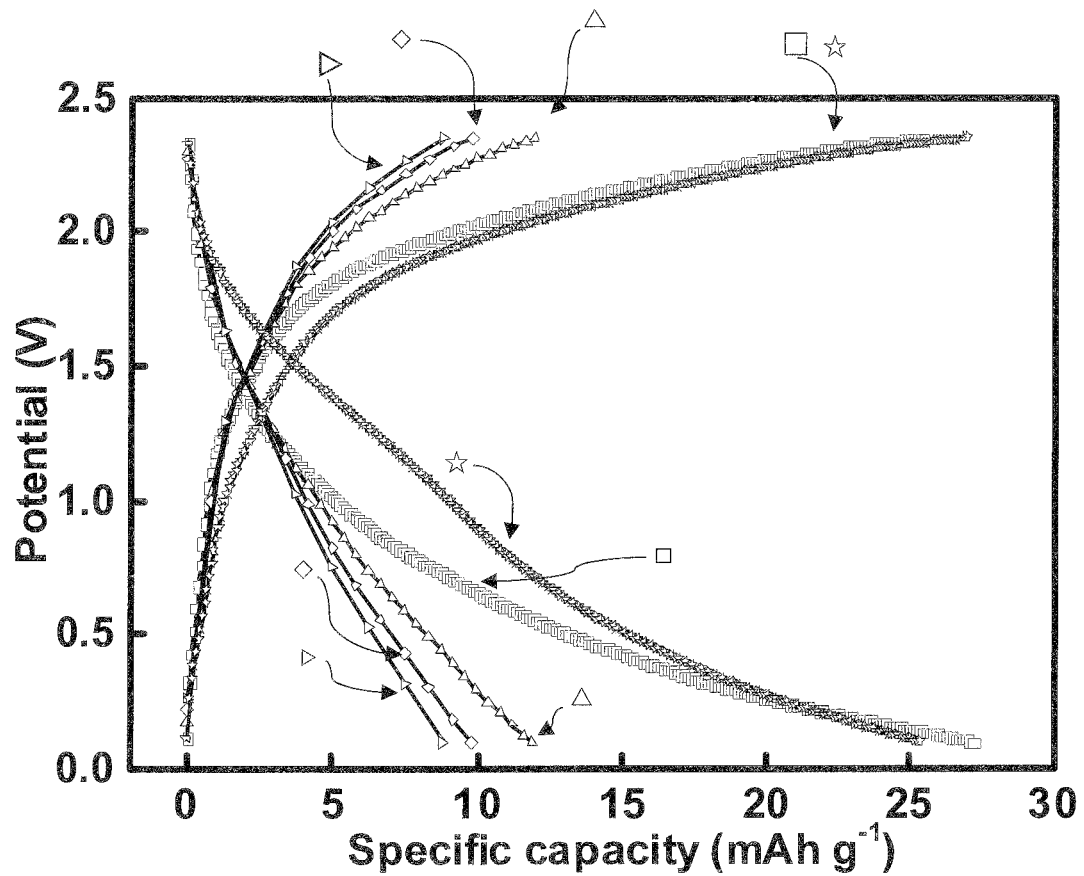
FIG. 10 shows charge/discharge curves for an aluminium ion cell comprising a cathode with a 1:1 ratio (by weight) of $B_2O_3$ and $Si_3N_4$ silicon nitride at current densities of 50 mA/g (□), 500 mA/g (Δ), 1000 mA/g (◇), 1500 mA/g (▷), and at 50 mA/g at the 100th cycle (☆).

Referring to FIGS. 10 and 11, an aluminium ion battery cell was prepared in accordance with the method described in the Examples, comprising a cathode with active materials consisting of a 1:1 ratio of boric anhydride and silicon nitride, $Si_3N_4$ (Cell 12 in Table 1). Cycling the cell at 50 mA/g shows coulombic efficiency stabilising at approximately 100%, and specific capacity around 25-28 mAh/g at a current density of 50 mA/g, and stabilising at about 10-20 mAh/g for current densities of 500-1500 mA/g.

Referring to FIGS. 12 and 13, an aluminium ion battery cell was prepared in accordance with the method described in the Examples, comprising a cathode with active materials consisting of a 1:1 ratio of manganese oxide ($MnO_2$) and hexagonal boron nitride (Cell 13 in Table 1). Cycling the cell at 50 mA/g shows coulombic efficiency stabilising at approximately 100%, and specific capacity around 27-29 mAh/g at a current density of 50 mA/g, and stabilising at about 10-20 mAh/g for current densities of 500-1500 mA/g.

Referring to FIGS. 14 and 15, an aluminium ion battery cell was prepared in accordance with the method described in the Examples, comprising a cathode with active materials consisting of a 1:1 ratio of manganese oxide ($MnO_2$) and carbon nitride, $C_3N_4$ (Cell 14 in Table 1). Cycling the cell at 50 mA/g shows coulombic efficiency stabilising at approximately 100%, and specific capacity around 30 mAh/g at a current density of 50 mA/g, and stabilising at about 10-20 mAh/g for current densities of 500-1500 mA/g.

Referring to FIGS. 16 and 17, an aluminium ion battery cell was prepared in accordance with the method described in the Examples, comprising a cathode with active materials consisting of a 1:1 ratio of manganese oxide ($MnO_2$) and silicon nitride, $Si_3N_4$ (Cell 15 in Table 1). Cycling the cell at 50 mA/g shows coulombic efficiency stabilising at approximately 100%, and specific capacity around 40-55 mAh/g at a current density of 50 mA/g, and stabilising at about 10-20 mAh/g for current densities of 500-1500 mA/g.

Referring to FIGS. 18 and 19, an aluminium ion battery cell was prepared in accordance with the method described in the Examples, comprising a cathode with active materials consisting of a 1:1 ratio of titanium oxide ($TiO_2$) and hexagonal boron nitride (Cell 16 in Table 1). Cycling the cell at 50 mA/g shows coulombic efficiency stabilising at approximately 100%, and specific capacity around 60 mAh/g at a current density of 50 mA/g, and stabilising at about 20-30 mAh/g for current densities of 500-1500 mA/g.

Referring to FIGS. 20 and 21, an aluminium ion battery cell was prepared in accordance with the method described in the Examples, comprising a cathode with active materials consisting of a 1:1 ratio of titanium oxide (TiO$_2$) and carbon nitride, C$_3$N$_4$ (Cell 17 in Table 1). Cycling the cell at 50 mA/g shows coulombic efficiency stabilising at approximately 100%, and specific capacity around 40-55 mAh/g at a current density of 50 mA/g, reducing over cycles to about 10-15 mAh/g.

Referring to FIG. 22, aluminium ion battery cells were prepared in accordance with the method described in the Examples, comprising a cathode with boric anhydride and hexagonal boron nitride active materials. The ratio of boric anhydride varied between 75% and 100% of the active materials in the cathode (Cells 5-9 in Table 1). Referring to Table 1, Cells 5 to 9 showed cell potentials of about 0.6-0.7 V, and specific capacities (measured at 50 mA/g) tending to stabilise between 40 and 60 mAh/g.

Referring to FIG. 23(a), an aluminium ion battery cell was prepared in accordance with the method described in the Examples, comprising a cathode with active materials consisting of 100% boric anhydride (Cell 1 in Table 1). Cycling the cell at 50 mA/g shows coulombic efficiency stabilising at approximately 90-100%, and specific capacity stabilising around 100-150 mAh/g at a current density of 50 mA/g, and coulombic efficiency between 80 and 85%.

Referring to FIGS. 24 and 25, an aluminium ion battery cell was prepared in accordance with the method described in the Examples, comprising a cathode with active materials consisting of a 5:95 ratio (by weight) of boric anhydride and hexagonal boron nitride (Cell 3 in Table 1). Cycling the cell at a current density of 50 mA/g shows the specific capacity stabilising around 30 mAh/g, and stabilising between 5-10 mAh/g for current densities of 500-1500 mA/g.

Referring to FIGS. 26 and 27, an aluminium ion battery cell was prepared in accordance with the method described in the Examples, comprising a cathode with active materials consisting of 100% hexagonal boron nitride (Cell 2 in Table 1). Cycling the cell at 50 mA/g and 500 mA/g shows coulombic efficiency stabilising at approximately 90-100%, and specific capacity stabilising around 20 mAh/g at a current density of 50 mA/g, and about 5-10 mAh/g at a current density of 500 mA/g.

Example 1—Cathode Manufacture

Generally, a slurry comprising 85% w/w of active material is prepared by combining and mixing with 6% of binder and 9% of conductive material in a solvent at room temperature. The slurry is sonicated and stirred continuously to form a homogenous mixture and is doctor bladed onto a current collector. The slurry is dried at room temperature, and then dried under vacuum at 120° C. for 12 hours to evaporate any residual solvent. Discs are cut out of the dried sheets and used as cathodes in laboratory battery test cells.

Example 2— Manufacture of Hexagonal Boron Nitride/Boron Oxide Cathode Material

A 1:1 hexagonal boron nitride (hBN)/boric anhydride cathode was prepared as follows: A slurry was prepared comprising a 1:1 mixture (by weight) of boric anhydride and boron nitride (85% by wt.), polyvinyl diethylene fluoride (PVDF) binder (9% by wt.) and a conductive carbon (6% by wt.) in N-methyl pyrrolidone. The slurry was doctor-bladed on molybdenum foil (thickness 0.1 mm, MTI Corporation) and dried in a vacuum oven at 120° C. for 12 hours to adhere the slurry on the conductive substrate and evaporate the solvent. The specific loading of the hBN and boric anhydride active materials was about 12 mg cm$^{-2}$.

The above procedure was followed to prepare hBN/boric anhydride cathodes having 5%, 75%, 80%, 85%, 90%, 95% and 100% boric anhydride.

Example 3— Manufacture of Cathode Materials Comprising Other Oxide/Nitride Combinations The methods described in Examples 1 and 2 were followed to prepare cathode materials comprising the combinations of oxides and nitrides listed in Table 1.

Example 4— Electrolyte

An electrolyte was prepared as follows: under inert conditions, anhydrous aluminium trichloride, AlCl$_3$ (Sigma-Aldrich) and 1-ethyl-3-methyl imidazolium chloride, EMImCl (97%, Sigma-Aldrich) were mixed in a molar ratio of 1.3:1, at room temperature.

Example 5— Cells

Polyether ether ketone (PEEK) pouch cells were prepared as follows: under inert conditions, the cathode was positioned at the bottom of the PEEK cell. A glass microfiber (Grade GF/F, Whatman) separator was positioned in the cell. 80 µl of the electrolyte of Example 4 was added to wet the separator. Aluminium foil (thickness 0.1 mm, 99%, Good Fellow) used as an anode and placed on top of the separator. The cell was then sealed to avoid incursion of air or moisture into the cell.

Cells were prepared with cathodes having the active materials (oxide component, nitride component) defined in Table 1, where each cathode was prepared following the general procedure described in Example 2. Testing was performed with a Neware® battery analyser, BTS 3000. Testing parameters included a current densities of 50, 500, 1000, or 1500 mA/g between voltages of 0.02 and 2.35 V. Each cell was cycled 50 times for each current density.

TABLE 1

| Cell no. | Oxide component | Nitride component | Ratio of oxide/nitride (by weight) | Cell Potential (V) | Specific capacity (mAh/g) | Coulombic efficiency (%) |
|---|---|---|---|---|---|---|
| 1 | B$_2$O$_3$ | — | 100/0 | 0.5 | ~100-150 | ~80-85 |
| 2 | — | hBN | 0/100 | 0.6 | 20-60 | ~70-90 |
| 3 | B$_2$O$_3$ | hBN | 5/95 | 1.6 (bend) | 30 | ~95-100 |
| 4 | B$_2$O$_3$ | hBN | 50/50 | 0.75 | 220 | ~80-85 |
| 5 | B$_2$O$_3$ | hBN | 75/25 | 0.7 | 45 | |
| 6 | B$_2$O$_3$ | hBN | 80/20 | 0.7 | 60 | >100 |
| 7 | B$_2$O$_3$ | hBN | 85/15 | 0.65 | 50 | >70, <100 |
| 8 | B$_2$O$_3$ | hBN | 90/10 | 0.65 | 50-60 | ~60-80 |

TABLE 1-continued

| Cell no. | Oxide component | Nitride component | Ratio of oxide/nitride (by weight) | Cell Potential (V) | Specific capacity (mAh/g) | Coulombic efficiency (%) |
|---|---|---|---|---|---|---|
| 9 | $B_2O_3$ | hBN | 95/5 | 0.6 | 60-320 | ~70-80 |
| 10 | $B_2O_3$ | $C_3N_4$ | 50/50 | ~1.7 (bend) | 90-120 | ~80 |
| 11 | $B_2O_3$ | AlN | 50/50 | 1.6-1.8 (bend) | 32-34 | ~85-90 |
| 12 | $B_2O_3$ | $Si_3N_4$ | 50/50 | 1.5-1.6 (bend) | 25-28 | ~95 |
| 13 | $MnO_2$ | hBN | 50/50 | 1.9 | 27-29 | >95 |
| 14 | $MnO_2$ | $C_3N_4$ | 50/50 | 1.6-1.7 (bend) | 30 | >90 |
| 15 | $MnO_2$ | $Si_3N_4$ | 50/50 | ~1.5 (bend) | 40-55 | >80 |
| 16 | $TiO_2$ | hBN | 50/50 | 1.5 (bend), 1.0 (plateau) | ~60 | ~90 |
| 17 | $TiO_2$ | $C_3N_4$ | 50/50 | 1.1 (plateau) | 40-55 | ~100 |

Unless the context clearly requires otherwise, throughout the description and the claims, the words "comprise", "comprising", and the like, are to be construed in an inclusive sense as opposed to an exclusive or exhaustive sense in the sense of "including, but not limited to".

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are to be considered to be expressly stated in this application in a similar manner.

The entire disclosures of all applications, patents and publications cited above and below, if any, are herein incorporated by reference.

Reference to any prior art in this specification is not, and should not be taken as, an acknowledgement or any form of suggestion that that prior art forms part of the common general knowledge in the field of endeavour in any country in the world.

The invention may also be said broadly to consist in the parts, elements and features referred to or indicated in the specification of the application, individually or collectively, in any or all combinations of two or more of said parts, elements or features.

Where in the foregoing description reference has been made to integers or components having known equivalents thereof, those integers are herein incorporated as if individually set forth.

It should be noted that various changes and modifications to the presently preferred embodiments described herein will be apparent to those skilled in the art. Such changes and modifications may be made without departing from the spirit and scope of the invention and without diminishing its attendant advantages. It is therefore intended that such changes and modifications be included in the present invention.

REFERENCES

Lin, Meng-Chang; Gong, Ming; Lu, Bingan; Wu, Yingpeng; Wang, Di-Yan; Guan, Mingyun; Angell, Michael; Chen, Changxin; Yang, Jiang; Hwang, Bing-Joe; Dai, Hongjie (6 Apr. 2015). "An ultrafast rechargeable aluminium-ion battery". Nature. 520: 324-328. doi:10.1038/nature14340. PMID 25849777.

Das, Shyamal K.; Mahapatra, Sadhan; Lahan, Homen (2017). "Aluminum-ion batteries: developments and challenges". Journal of Materials Chemistry A: 6347-6367. doi:10.1039/c7ta00228a.

Ambroz, F.; Macdonald, T. J.; Nann, T. Trends in Aluminium-Based Intercalation Batteries. Adv. Energy Mater. 2017, 1602093.

Zafar, Z. A. et al. A super-long life rechargeable aluminum battery. Solid State Ion. 320, 70-75 (2018).

Eftekhari, A. Low voltage anode materials for lithium-ion batteries. Energy Storage Mater. 7, 157-180 (2017).

Mukherjee, R. & Koratkar, N. A. U.S. Pat. No. 9,819,220.

Brown, G. M. et al. U.S. Pat. No. 9,997,802.

What we claim is:

1. A cathode for an aluminium ion battery comprising an active material, the active material comprising an oxide of boron, the oxide of boron comprising at least 75% (by weight) of the active material.

2. The cathode of claim 1, wherein the active material further comprises a boron nitride.

3. The cathode of claim 2, wherein a ratio of the oxide of boron to the boron nitride is between 5:95 and 95:5 (by weight).

4. The cathode of claim 2, wherein a ratio of the oxide of boron to the boron nitride is about 1:1 (by weight).

5. The cathode of claim 1, wherein the oxide of boron comprises boric anhydride.

6. The cathode of claim 2, wherein the boron nitride comprises a 2D layered material.

7. The cathode of claim 2, wherein the boron nitride comprises hexagonal boron nitride.

8. The cathode of claim 1, further comprising a conductive material.

9. The cathode of claim 8, where in the conductive material comprises conductive carbon.

10. An aluminum ion battery cell comprising a cathode of claim 1 and an anode, wherein the anode comprises aluminum, an electrolyte in electrical contact with the anode and/or cathode, and optionally an ion permeable separator located between the anode and the cathode.

11. A cathode for an aluminum ion battery comprising an active material, the active material comprising a main group element nitride, and an oxide of a main group element, wherein a ratio of the oxide of a main group element to the main group element nitride is between 5:95 and 95:5 (by weight).

12. The cathode of claim 11, wherein the main group element nitride is selected from a nitride of boron, carbon, aluminum, and silicon, and wherein the oxide of a main group element is an oxide of boron.

13. An aluminum ion battery cell comprising the cathode of claim 11 and an anode, wherein the anode comprises aluminum, further comprising an electrolyte in electrical contact with the anode and/or cathode, and optionally an ion permeable separator located between the anode and the cathode.

* * * * *